(12) United States Patent
Lei et al.

(10) Patent No.: US 11,015,443 B2
(45) Date of Patent: May 25, 2021

(54) ESTIMATION OF HORIZONTAL STRESSES AND NONLINEAR CONSTANTS IN ANISOTROPIC FORMATIONS SUCH AS INTERBEDDED CARBONATE LAYERS IN ORGANIC-SHALE RESERVOIRS

(71) Applicant: Schlumberger Technology Corporation, Sugar Land, TX (US)

(72) Inventors: Ting Lei, Arlington, MA (US); Smaine Zeroug, Lexington, MA (US); Bikash Kumar Sinha, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 51 days.

(21) Appl. No.: 16/306,688

(22) PCT Filed: May 31, 2017

(86) PCT No.: PCT/US2017/035083
§ 371 (c)(1),
(2) Date: Dec. 3, 2018

(87) PCT Pub. No.: WO2017/210231
PCT Pub. Date: Dec. 7, 2017

(65) Prior Publication Data
US 2019/0330981 A1 Oct. 31, 2019

Related U.S. Application Data

(60) Provisional application No. 62/344,110, filed on Jun. 1, 2016.

(51) Int. Cl.
*E21B 49/00* (2006.01)
*G01V 1/30* (2006.01)
(Continued)

(52) U.S. Cl.
CPC ............ *E21B 49/006* (2013.01); *G01V 1/303* (2013.01); *G01V 1/306* (2013.01); *G01V 1/46* (2013.01);
(Continued)

(58) Field of Classification Search
CPC ...... E21B 49/006; G01V 1/303; G01V 1/306; G01V 1/46; G01V 1/51
See application file for complete search history.

(56) References Cited

U.S. PATENT DOCUMENTS 4,641,724 A * 2/1987 Chow ...................... G01V 1/44
181/104
5,142,471 A * 8/1992 Desbrandes ............ E21B 47/06
702/12

(Continued)

OTHER PUBLICATIONS

Sinha et al., "Analysis of Sonic Data in Indonesian Well for Formation Damage, Stresses, and Bedding," SPE-78232-MS, SPE/ISRM Rock Mechanics Conference, Society of Petroleum Engineers, Abstract (Year: 2002).*

(Continued)

*Primary Examiner* — John Fitzgerald
(74) *Attorney, Agent, or Firm* — Trevor G. Grove

(57) ABSTRACT

Methods and systems are provided that identify relatively large anisotropic horizontal stresses in a formation based on (i) azimuthal variations in the compressional and shear slownesses or velocities of the formation measured from ultrasonic data acquired by at least one acoustic logging tool as well as (ii) cross-dipole dispersions of the formation measured from sonic data acquired by the at least one acoustic logging tool. In addition, the azimuthal variations in the compressional and shear slownesses or velocities of the formation and dipole flexural dispersions of the formation can be jointly inverted to obtain the elastic properties of the rock of the formation in terms of linear and nonlinear (Continued)

constants and the magnitude of maximum horizontal stress of the formation. A workflow for estimating the magnitude of the maximum horizontal stress can employ estimates of certain formation properties, such as overburden stress, magnitude of minimum horizontal stress, and pore pressure.

17 Claims, 26 Drawing Sheets

(51) Int. Cl.
*G01V 1/46* (2006.01)
*G01V 1/50* (2006.01)

(52) U.S. Cl.
CPC .......... *G01V 1/50* (2013.01); *G01V 2210/616* (2013.01); *G01V 2210/626* (2013.01); *G01V 2210/6222* (2013.01); *G01V 2210/6242* (2013.01)

(56) References Cited

U.S. PATENT DOCUMENTS

| | | | | | |
|---|---|---|---|---|---|
| 5,475,650 | A * | 12/1995 | Sinha | .................. | G01V 1/44 367/27 |
| 5,544,127 | A * | 8/1996 | Winkler | .................. | G01V 1/303 181/104 |
| 6,098,021 | A * | 8/2000 | Tang | .................. | G01V 1/50 702/14 |
| 6,351,991 | B1 * | 3/2002 | Sinha | .................. | E21B 49/006 367/27 |
| 6,510,104 | B1 * | 1/2003 | Ikegami | .................. | G01V 1/46 367/31 |
| 6,510,389 | B1 * | 1/2003 | Winkler | .................. | G01N 29/07 367/27 |
| 6,614,716 | B2 * | 9/2003 | Plona | .................. | G01V 1/48 166/250.01 |
| 6,678,616 | B1 * | 1/2004 | Winkler | .................. | G01V 1/44 181/104 |
| 6,714,480 | B2 * | 3/2004 | Sinha | .................. | G01V 1/48 175/40 |
| 6,714,873 | B2 * | 3/2004 | Bakulin | .................. | G01V 1/30 702/14 |
| 7,310,285 | B2 * | 12/2007 | Donald | .................. | G01V 1/284 367/40 |
| 7,336,562 | B1 * | 2/2008 | Hoyle | .................. | G01V 1/523 367/25 |
| 7,463,550 | B2 * | 12/2008 | Sinha | .................. | G01V 1/50 367/25 |
| 7,529,152 | B2 * | 5/2009 | Sinha | .................. | G01V 1/50 367/31 |
| 8,831,923 | B2 * | 9/2014 | Lei | .................. | G01V 1/48 703/10 |
| 9,063,251 | B2 * | 6/2015 | Moos | .................. | G01V 1/50 |
| 9,086,506 | B2 * | 7/2015 | Sinha | .................. | G01V 1/284 |
| 9,477,002 | B2 * | 10/2016 | Miller | .................. | G01V 1/46 |
| 9,494,704 | B2 * | 11/2016 | Sinha | .................. | G01V 1/48 |
| 10,054,708 | B2 * | 8/2018 | Sinha | .................. | G01V 1/284 |
| 10,539,699 | B2 * | 1/2020 | Kalyanraman | .................. | G01V 1/50 |
| 10,724,346 | B2 * | 7/2020 | Eftekhari Far | .................. | G01V 1/40 |
| 2003/0167835 | A1 * | 9/2003 | Sinha | .................. | G01V 1/48 73/152.16 |
| 2004/0158997 | A1 | 8/2004 | Tang | | |
| 2006/0256656 | A1 * | 11/2006 | Sinha | .................. | G01V 1/50 367/31 |
| 2007/0183259 | A1 * | 8/2007 | Yogeswaren | .................. | G01V 1/44 367/25 |
| 2008/0106975 | A1 * | 5/2008 | Donald | .................. | G01V 1/284 367/40 |
| 2009/0109794 | A1 * | 4/2009 | Sinha | .................. | E21B 49/006 367/35 |
| 2009/0185445 | A1 * | 7/2009 | Yogeswaren | .................. | G01V 1/44 367/25 |
| 2009/0225627 | A1 * | 9/2009 | Sinha | .................. | G01V 1/50 367/31 |
| 2010/0020639 | A1 | 1/2010 | Sinha | | |
| 2010/0020642 | A1 * | 1/2010 | Sinha | .................. | G01V 1/50 367/75 |
| 2011/0182144 | A1 | 7/2011 | Gray | | |
| 2012/0163123 | A1 * | 6/2012 | Moos | .................. | G01V 1/50 367/31 |
| 2015/0260870 | A1 | 9/2015 | Sinha | | |
| 2015/0301214 | A1 | 10/2015 | Moos | | |
| 2018/0030815 | A1 * | 2/2018 | Eftekhari Far | ...... | G01V 99/005 |
| 2018/0306751 | A1 * | 10/2018 | Zeroug | .................. | G01N 29/06 |
| 2019/0129053 | A1 * | 5/2019 | Wang | .................. | G01V 1/284 |
| 2019/0331820 | A1 * | 10/2019 | Goodman | .................. | G01N 15/082 |

OTHER PUBLICATIONS

Alfred, R. M. "Shear Data in the Presence of Azimuthal Anisotropy: Dilly, Texas", Expanded Abstracts, 56th SEG Annual International meeting, Houston, Texas 1986, pp. 476-479.
Ekstrom, M. P., "Dispersion Estimation from Borehole Acoustic Arrays Using a Modified Matrix Pencil Algorithm," Conference Record of the Twenty-Ninth Asilomar Conference on Signals, Systems and Computers, 1995, vol. 1, pp. 449-453.
Lang, S. W. et al., "Estimating Slowness Dispersion from Arrays of Sonic Logging Waveforms," Geophysics, 1989, 52(4), p. 530-544.
Liu, Q. H. et al., "A 3D cylindrical PML/FDTD method for elastic waves in fluid-filled pressurized boreholes in triaxially stressed formations," Geophysics, 2003, 68(5), pp. 1731-1743.
Norris, A. N. et al., "Acoustoelasticity of solid/fluid composite systems," Geophysical Journal International, 1994 118, pp. 439-446.
Pistre, V. et al., "A Modular Wireline Sonic Tool for Measurements of 3D (Azimuthal, Radial, and Axial) Formation Acoustic Properties", presented at the SPWLA 46th Annual Logging Symposium, New Orleans, Louisiana, U.S.A., 2005, pp. 13 pages.
Sinha, B. K. "Elastic Waves in Crystals Under a Bias," Ferroelectrics, 1982, 41, pp. 61-73.
Sinha, B. K. et al., "Estimation of Formation Stresses Using Borehole Sonic Data", presented at the 49th Annual Logging Symposium, Society of Petrophysicists and Well-Log Analysts, Austin, Texas, USA, 2008, 16 pages.
Sinha, B. K. et al., "Stress-induced azimuthal anisotropy in borehole flexural waves", Geophysics, 1996, 61(6), pp. 1899-1907.
Winkler, K. W., et al. "Effects of borehole stress concentrations on dipole anisotropy measurements", Geophysics,63(1), 1989, pp. 11-17.
Zeroug, S. et al., "High-resolution in-situ elastic-wave property characterization of thinly laminated shale formations", Presented at Applied Geoscience Conference Integrated Approaches of Unconventional Reservoir Assessment and Optimization—Houston, TX, 2016, 19 pages.

\* cited by examiner

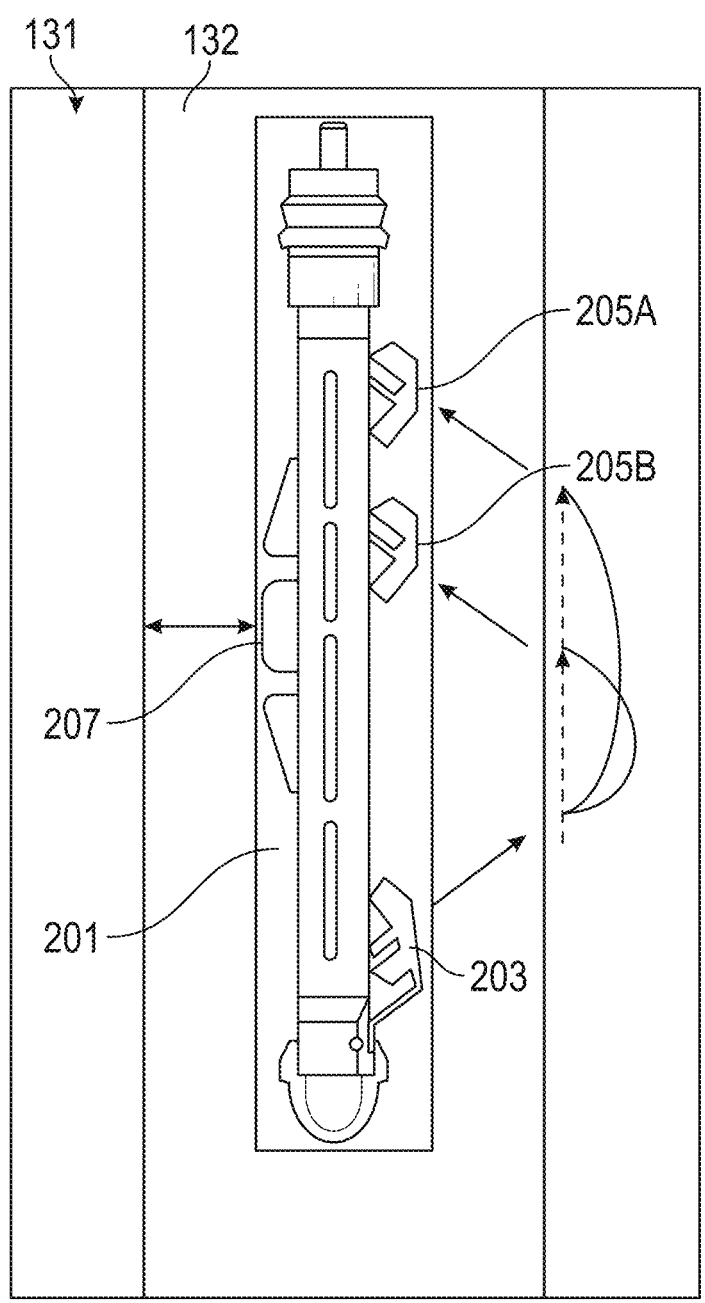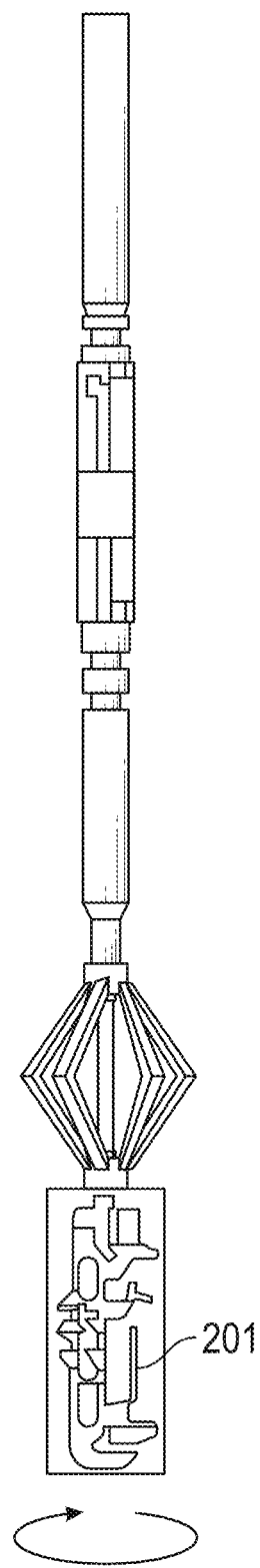
FIG. 2B
FIG. 2C

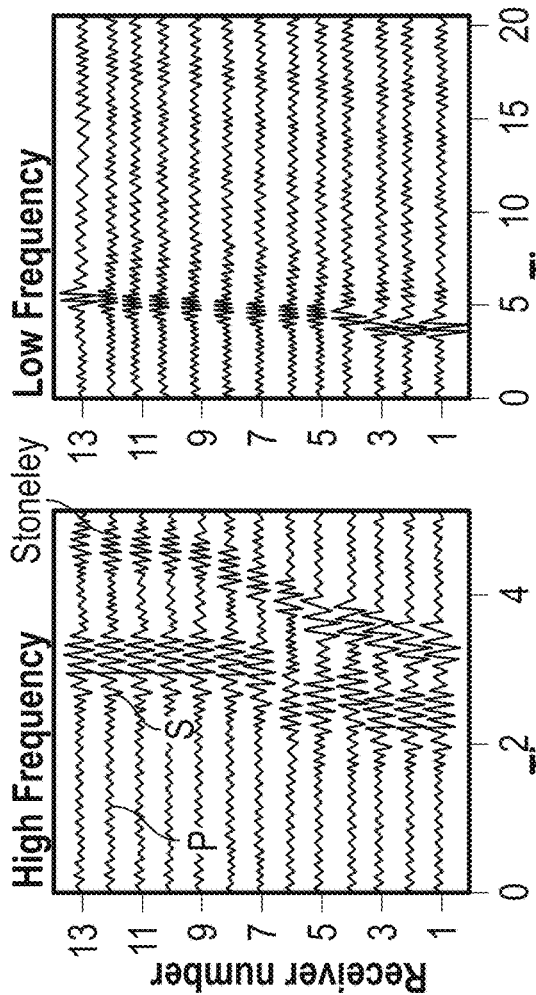
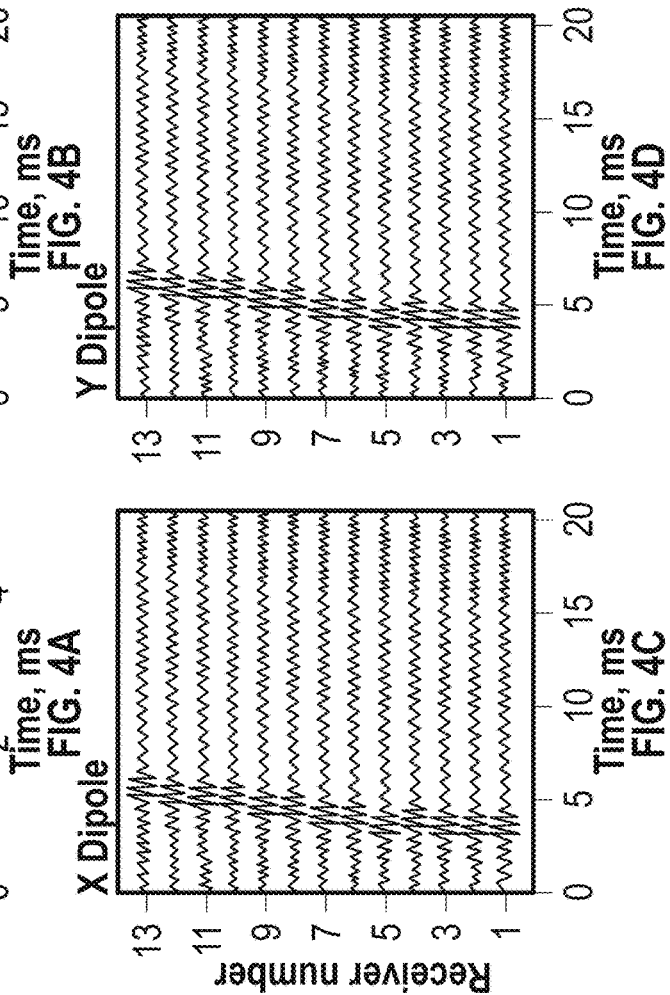
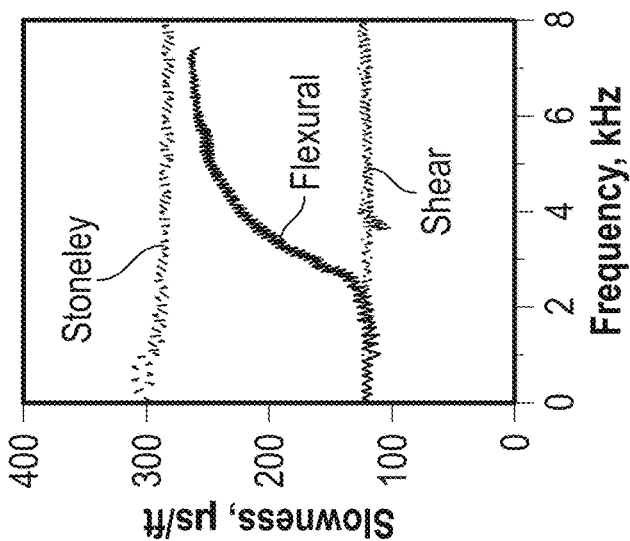
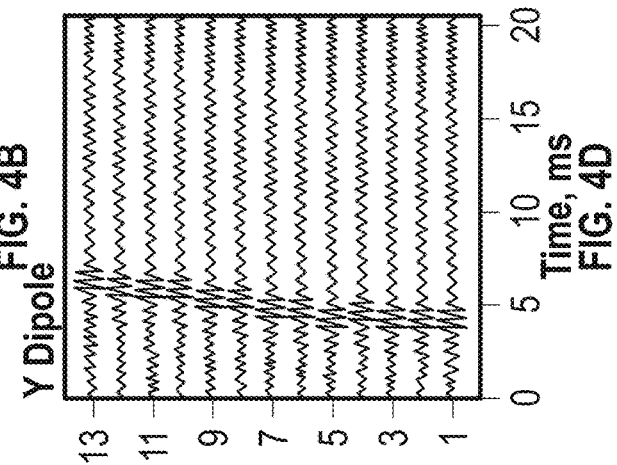
FIG. 4A  FIG. 4B  FIG. 4C  FIG. 4D  FIG. 4E

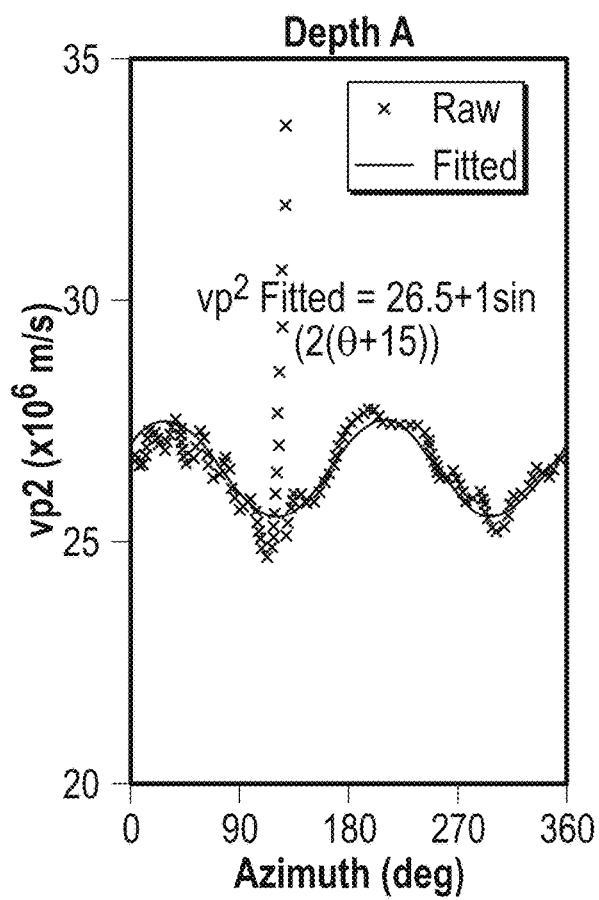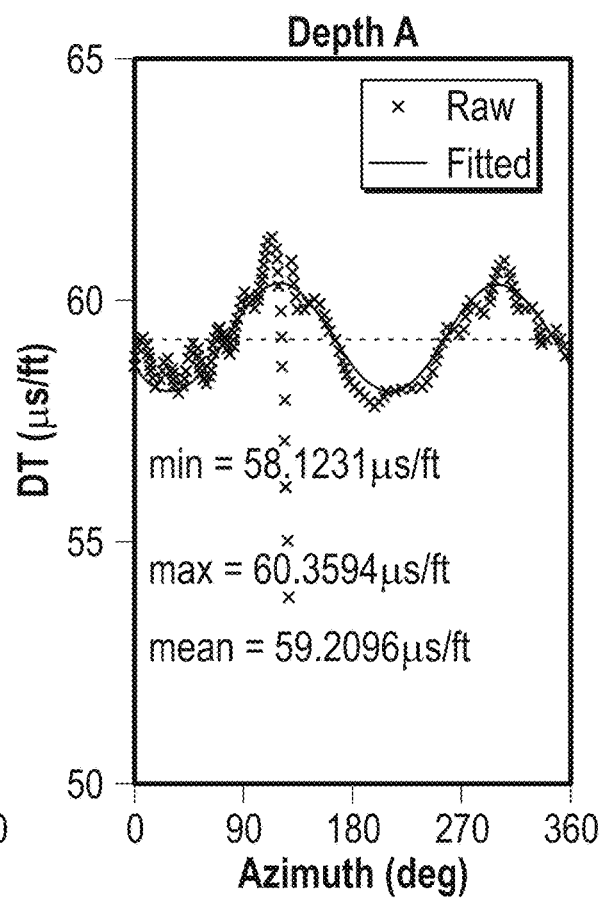
FIG. 10A
FIG. 10B

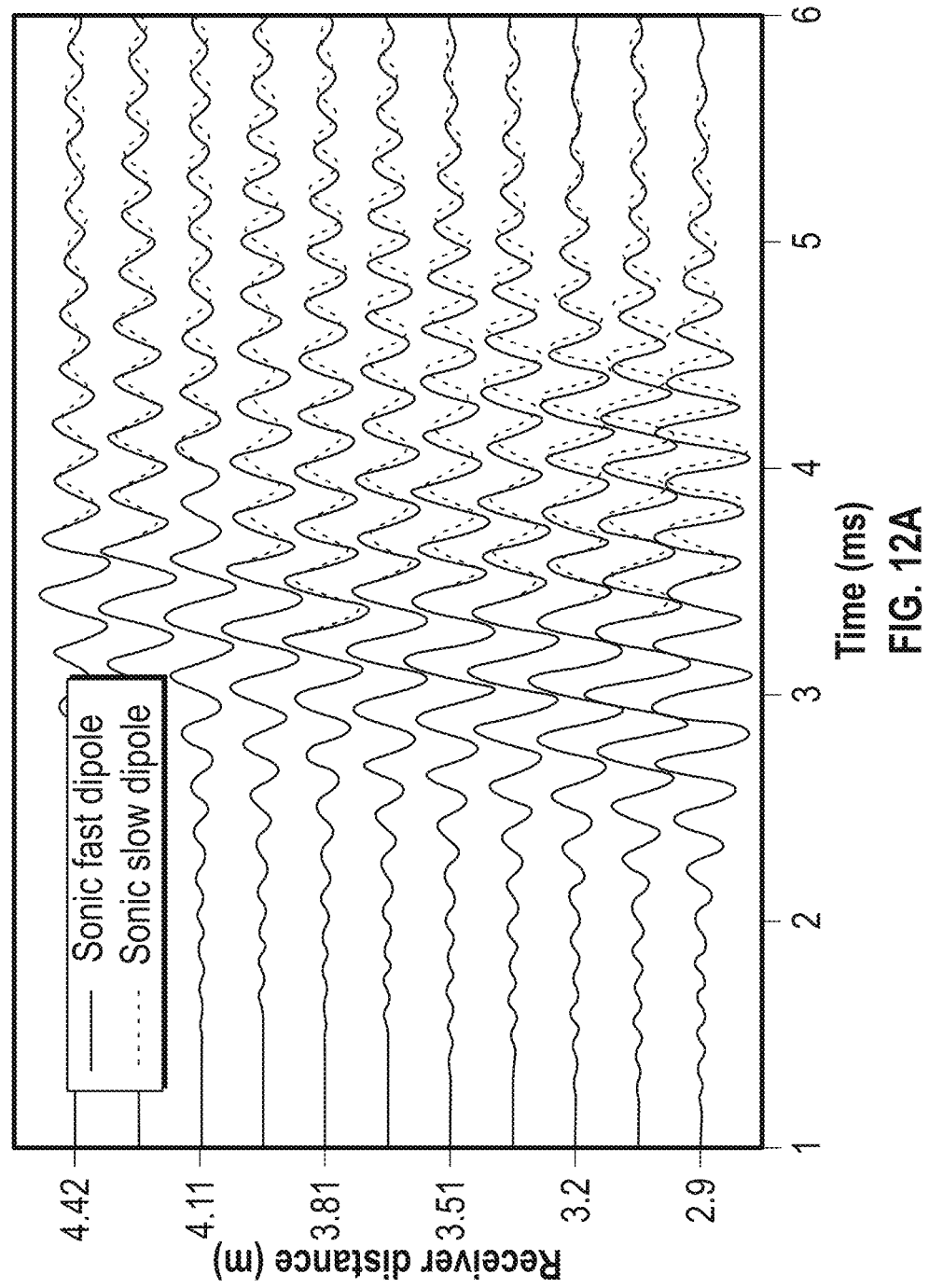

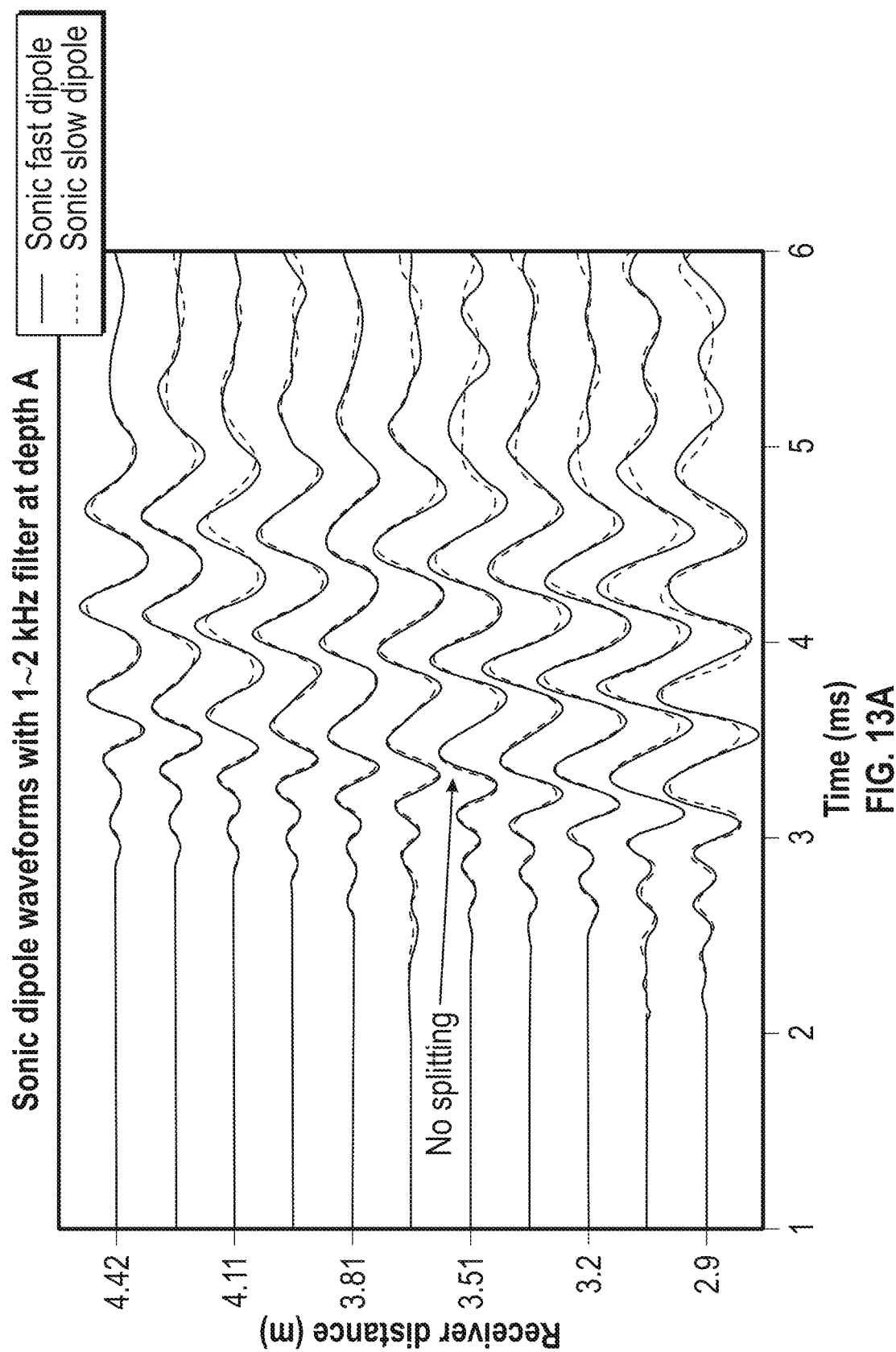

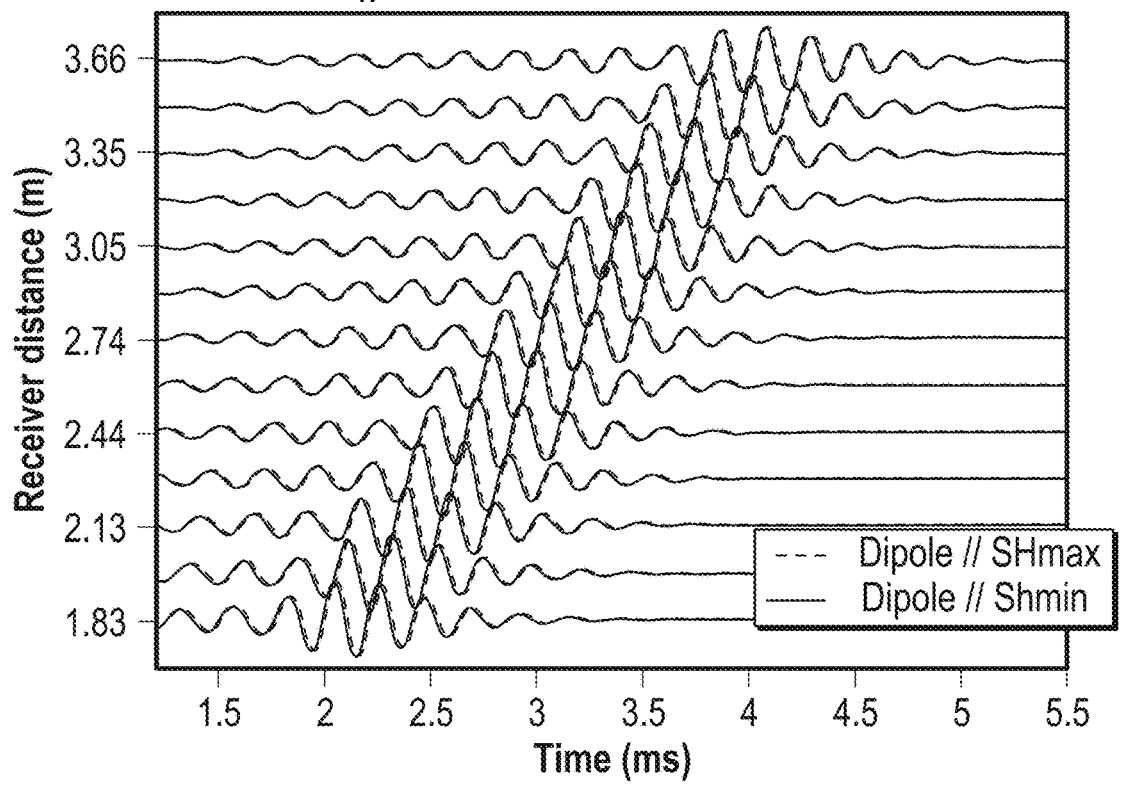
FIG. 17A1
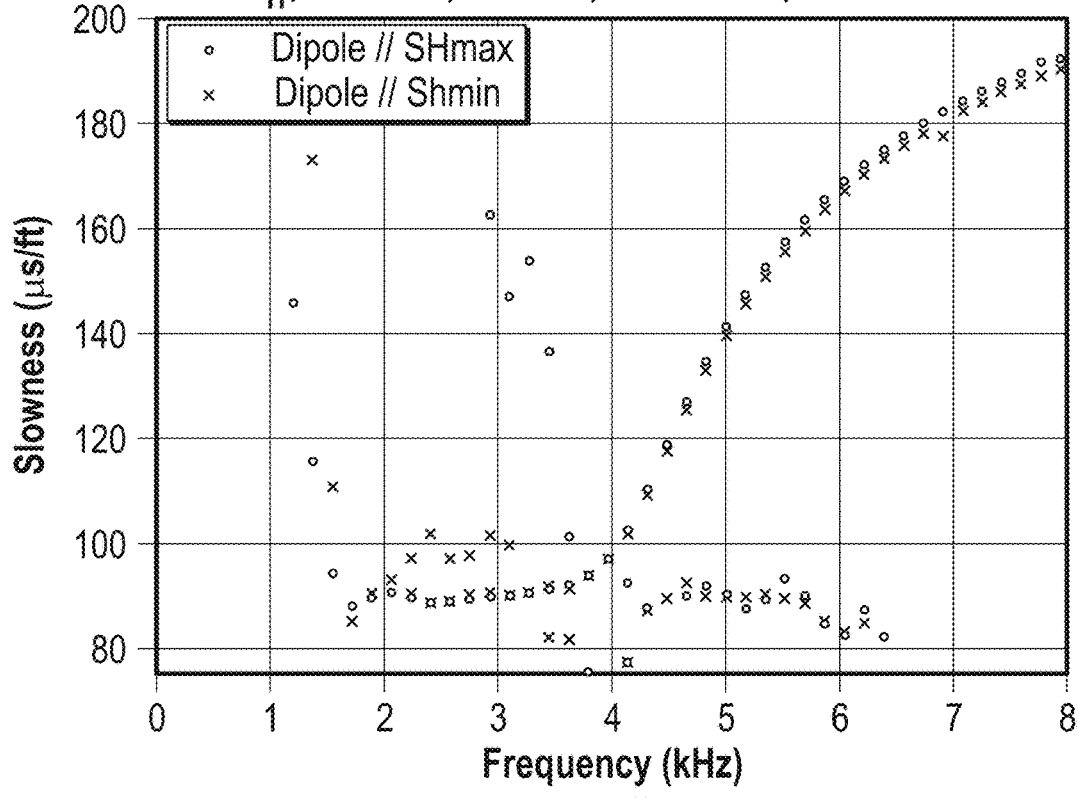
FIG. 17A2

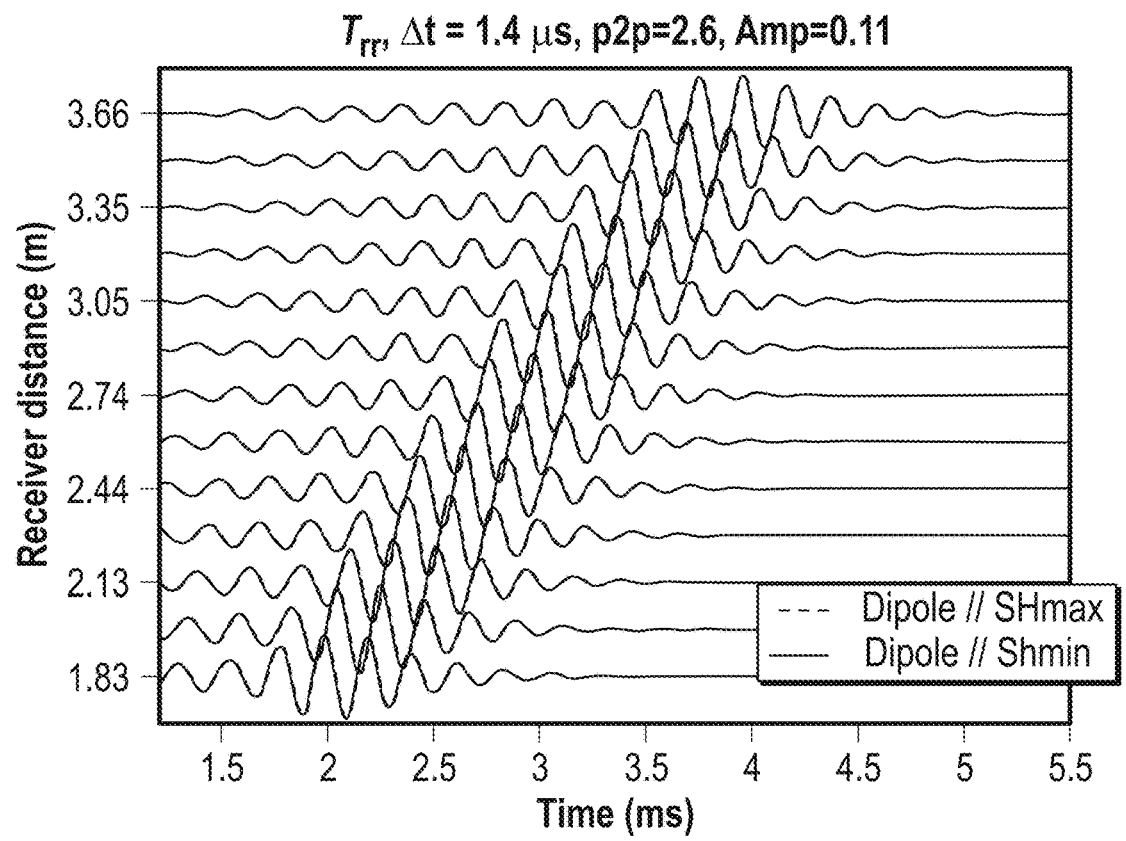
FIG. 17B1
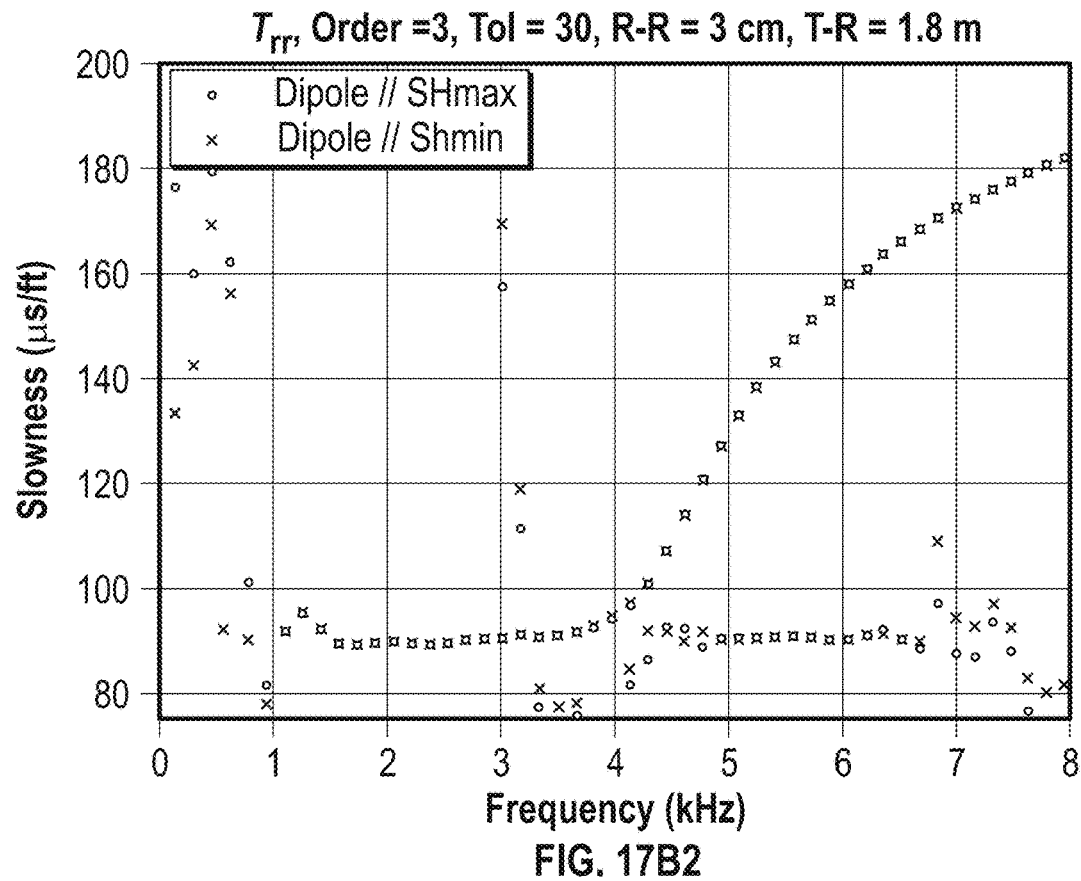
FIG. 17B2

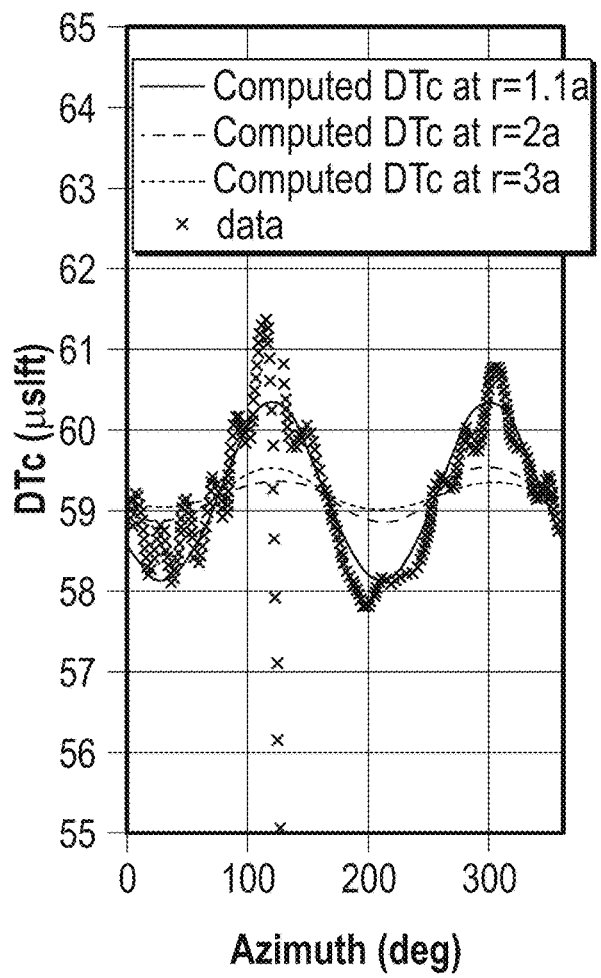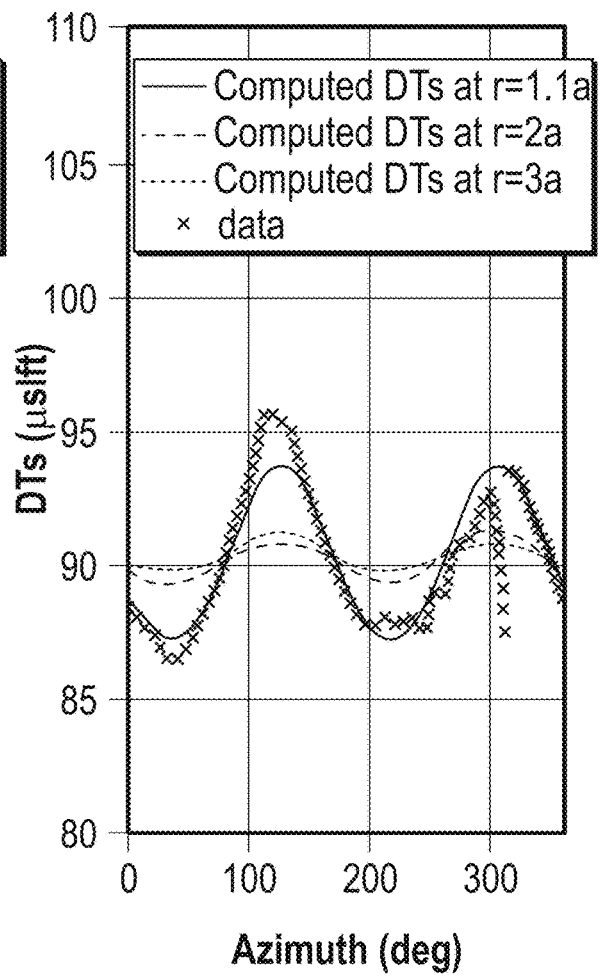
FIG. 19A
FIG. 19B

ESTIMATION OF HORIZONTAL STRESSES AND NONLINEAR CONSTANTS IN ANISOTROPIC FORMATIONS SUCH AS INTERBEDDED CARBONATE LAYERS IN ORGANIC-SHALE RESERVOIRS

CROSS-REFERENCE TO RELATED APPLICATIONS

The present application claims priority from U.S. Provisional Appl. No. 62/344,110, filed on Jun. 1, 2016, entitled "Estimation of Horizontal Stresses and Nonlinear Constants in Interbedded Carbonate Layers in Organic-Shale Reservoirs," herein incorporated by reference in its entirety.

BACKGROUND

1. Field

The present application relates to analysis of hydrocarbon-containing reservoirs using data acquired from one or more downhole acoustic logging tools.

2. State of the Art

Formation stresses can affect geophysical prospecting and development of oil and gas reservoirs. For example, overburden stress, maximum and minimum horizontal stresses, pore pressure, wellbore pressure and rock strength can be used to produce a failure model to aid in well planning, wellbore stability calculations and reservoir management. It is known that elastic wave velocities change as a function of prestress in a propagating medium.

Various devices are known for measuring formation characteristics based on sonic data. Mechanical disturbances are used to establish elastic waves in earth formations surrounding a borehole, and properties of the waves are measured to obtain information about the formations through which the waves have propagated. For example, compressional, shear and Stoneley wave information, such as velocity (or its reciprocal, slowness) in the formation and in the borehole, can help in evaluation and production of hydrocarbon resources. One example of a sonic logging device is the Sonic Scanner® from Schlumberger. Another example is described in Pistre et al., "A modular wireline sonic tool for measurements of 3D (azimuthal, radial, and axial) formation acoustic properties," Proceedings of the 46th Annual Logging Symposium, Society of Professional Well Log Analysts, Paper P, 2005. Other tools are also known. These tools may provide compressional slowness ($\Delta t_c$ or DTc), shear slowness ($\Delta t_s$ or DTs), and Stoneley slowness ($\Delta t_{st}$) each as a function of depth, z, where slowness is the reciprocal of velocity and corresponds to the interval transit time typically measured by sonic logging tools.

Organic-shale reservoirs contain interbedded stringers or carbonate layers of varying thicknesses that support large amounts of horizontal stresses. Some of these highly stressed layers in the presence of underbalance drilling exhibit breakouts when near-wellbore stresses exceed the rock compressive-shear strength. Other such layers might be subject to large anisotropic horizontal stresses, yet do not exhibit any breakouts characterized by non-circular borehole cross-section. Conventional techniques cannot identify layers that are subject to large anisotropic horizontal stresses in the absence of breakouts.

SUMMARY

The methods and systems of the present disclosure identify relatively large anisotropic horizontal stresses in a formation based on (i) azimuthal variations in the compressional and shear slownesses or velocities of the formation measured from ultrasonic data acquired by at least one acoustic logging tool as well as (ii) cross-dipole dispersions of the formation measured from sonic data acquired by the at least one acoustic logging tool. In addition, the azimuthal variations in the compressional and shear slownesses or velocities of the formation and dipole flexural dispersions of the formation measured from sonic data acquired by the at least one acoustic logging tool can be jointly inverted to obtain the elastic properties of the rock of the formation in terms of linear and nonlinear constants and the magnitude of maximum horizontal stress of the formation. The methods and systems of the present disclosure can estimate the magnitude of the maximum horizontal stress based on estimates of certain formation properties, such as overburden stress, magnitude of minimum horizontal stress, and pore pressure. These formation parameters can be obtained utilizing conventional techniques, such as a mini-frac, leak-off tests, or modeling.

Note that near-wellbore stress concentrations in certain anisotropic formations (such as interbedded carbonate layers in shale formations) cause azimuthal variations in the compressional and shear velocities (or slownesses). These variations can be described by corresponding azimuthal variations in the effective compressional and shear moduli based on an acoustoelastic model. Effective compressional and shear moduli are shown to be functions of radial and circumferential coordinates of the position in the formation. An inversion workflow as described herein constructs sum and difference equations for the effective compressional and shear moduli at two orthogonal azimuths (r, 0) and (r, 90). These sum and difference equations can be inverted to obtain the difference between the magnitude of maximum horizontal stress ($SH_{max}$) and the magnitude of minimum horizontal stress ($SH_{min}$) as well as certain nonlinear constants of thin layers probed by the at least one acoustic logging tool. When the magnitude of minimum horizontal stress $SH_{min}$ is known or obtained from a conventional technique, the magnitude of magnitude of maximum horizontal stress $SH_{max}$ can be estimated together with the nonlinear constants, which is referred to as a local reference state.

The methods and systems of the present disclosure as described herein are based on the observation that an ultrasonic measurement (such as carried through Schlumberger's ISOLATION SCANNER™ Tool) identifies azimuthal variations in the compressional and shear slownesses or velocities close to the borehole surface. Azimuthal variations in such plane wave slownesses or velocities are indicators of differences between the maximum and minimum horizontal stresses. The same depth interval probed by a sonic measurement (such as carried out through Schlumberger's SONIC SCANNER™ Tool) shows no dipole shear velocity (or slowness) splitting signature at low frequency components (e.g., frequencies less than 3 kHz). Nevertheless, high frequency components (e.g., frequencies greater than 3 kHz and possibly higher than 5 kHz) of the dipole flexural dispersions exhibit a splitting signature in dipole shear velocity (or slowness), which is consistent with the difference between the maximum and minimum horizontal stress magnitudes estimated from the azimuthal variations of compressional and shear slownesses or velocities identified by the ultrasonic measurement. These conditions can be identified by an acoustoelastic model as described herein where two nonlinear constants $c_{144}$ and $c_{155}$ are essentially the same. The proposed workflow is of significant value in the sense that it provides a way to estimate the magnitude of maximum horizontal stress $SH_{max}$ for which there are no conventional techniques in the absence of borehole breakouts.

BRIEF DESCRIPTION OF THE DRAWINGS

FIGS. 2B and 2C are schematic diagrams of the ultrasonic logging tool of FIG. 2A concentrically placed to perform ultrasonic measurements in a fluid-filled open borehole.

FIGS. 4A to 4D illustrate waveforms acquired by the sonic logging tool of FIGS. 3A and 3B from a representative fast formation. FIG. 4E is a dispersion curve showing slowness versus frequency for the nondispersive shear and slightly dispersive Stoneley arrivals of the monopole mode waveforms of FIGS. 4A and 4B together with the highly dispersive flexural arrivals of the dipole mode waveforms of FIGS. 4C and 4D.

FIGS. 10A and 10B are plots of azimuthal variations of compressional velocity squared ($V_p^2$) and compressional slowness (DTc) in the cross-sectional plane of the borehole, which are determined by the ultrasonic measurements in the presence of non-uniform borehole stress concentrations caused by the far-field ($SH_{max}-SH_{min}$). Note that the azimuthal variation of ($V_p^2$) conforms to a sinusoidal variation, whereas the azimuthal variation of compressional velocity $V_p$ alone does not.

FIG. 12A depicts an overlay of the fast- and slow-dipole waveforms at a depth A recorded by sonic measurements carried out by the sonic logging tool of FIGS. 3A and 3B.

FIG. 13A provides an overlay of the fast- and slow dipole waveforms recorded by the sonic measurements carried out by the sonic tool of FIGS. 3A and 3B at depth A with a 1~2 kHz frequency filter.

FIGS. 17A1 and 17A2 show synthetic waveforms and flexural dispersion plots (dispersion properties of such synthetic waveforms), respectively, which were generated by finite-difference modeling code using the following parameters: $c_{111}$=−170000 GPa, $c_{112}$=−40520 GPa, $c_{155}$=−32390 GPa, $M_{ref}$=55.49 GPa, $\mu_{ref}$=30.48 GPa, SHmin=52.72 MPa, SHmax=54.72 MPa ($M_{ref}$=λ+2μ).

FIGS. 17B1 and 17B2 show synthetic waveforms and flexural dispersion plots (dispersion properties of such synthetic waveforms), respectively, which were generated by finite-difference modeling code using the following parameters: $c_{111}$=−78420 GPa, $c_{112}$=−18680 GPa, $c_{155}$=−14930 GPa, $M_{ref}$=65.07 GPa, $\mu_{ref}$=30.48 GPa, SHmin=52.72 MPa, SHmax=58.72 MPa.

FIGS. 19A and 19B are plots that depict azimuthal variations in the compressional (DTc) and shear (DTs) slownesses, respectively, as a function of radial distance normalized to the borehole radius calculated from the synthetic sonic data. FIGS. 19A and 19B also shows azimuthal variations in the compressional (DTc) and shear (DTs) slownesses (field data) derived from the ultrasonic data waveforms acquired by the ultrasonic measurements. Note that the azimuthal variation in slowness calculated at a radial position r=1.1a is close to the measured azimuthal variation in slowness obtained from the processing of the pitch-catch ultrasonic measurements acquired every 10 degrees. Agreement between the calculated and measured azimuthal variations in the compressional and/or shear velocities can be used to validate the proposed technique and the accuracy of the inverted linear and nonlinear constants together with the magnitude of maximum horizontal stress $SH_{max}$.

DETAILED DESCRIPTION OF THE PREFERRED EMBODIMENTS

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

There are two types of borehole acoustic measurements that are commonly used in oilfield applications. The first type of borehole acoustic measurements is an ultrasonic (high-frequency) measurement in the signal frequency range from 80 kHz to several hundred kHz. The ultrasonic measurement is commonly used in a fluid-filled cased hole environment for in situ evaluation of cementation. The second type of acoustic measurement is a sonic (low-frequency) measurement in the signal frequency range from a few hundreds of Hz to 20 kHz. The sonic measurement is commonly used in a fluid-filled open borehole for in situ evaluation of properties of the formation (such as porosity and mechanical rock properties including formation stresses) traversed by the open borehole as well as in a fluid-filled cased hole environment for in situ evaluation of cementation.

Formation properties often vary directionally, so to be completely described, they must be measured in three dimensions. The borehole has a natural, cylindrical three-dimensional (3D) coordinate system: axial direction z along the central axis of the borehole; radial direction r perpendicular to the central axis of the borehole; and azimuthal direction θ around the central axis of the borehole. The azimuthal direction θ is an angle between 0 and 360 degrees from the central axis of the borehole in a plane orthogonal to the borehole axis.

Figure 1:
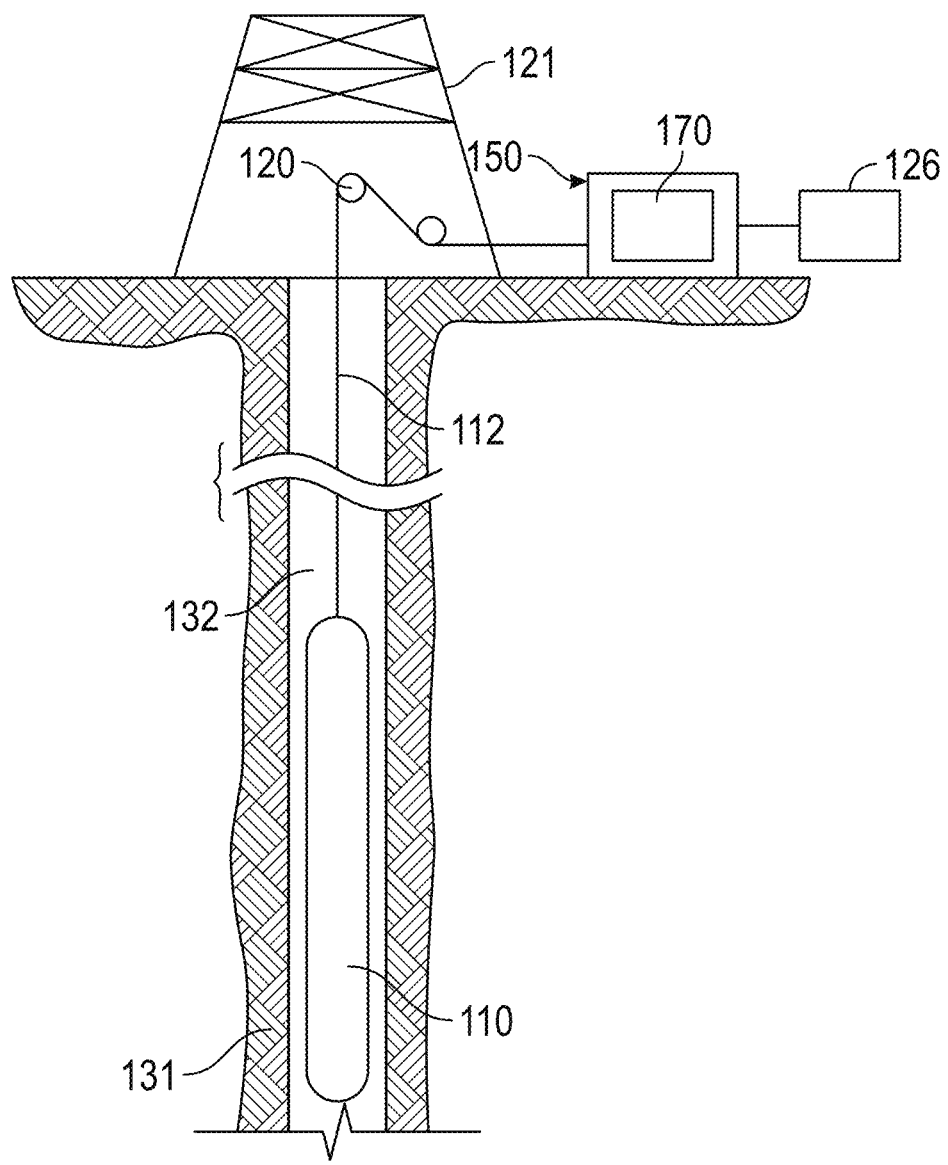
FIG. 1 is a schematic diagram of a wellsite and a drilled vertical well that embodies an exemplary wireless logging system according to the present disclosure.

According to one embodiment of the invention, the workflows and system as described herein utilizes both ultrasonic measurements and sonic measurements obtained from an open borehole as shown in FIG. 1. A subsurface formation 131 is traversed by an open borehole 132, which is filled with a fluid (such as drilling fluid or mud). One or more logging tools (one shown as 110) are suspended on an armored cable 112 and may have optional centralizers (not shown). The cable 112 extends up the borehole 132, over a sheave wheel 120 on a derrick 121 to a winch forming part of surface equipment 150. Known depth gauging apparatus (not shown) is provided for measuring cable displacement over the sheave wheel 120 and accordingly the depth of the logging tool(s) 110 in the borehole 132. The tool(s) 110 can be configured to carry out both ultrasonic measurements and sonic measurements over varying locations or depths within the fluid-filled open borehole 132. Processing and interface circuitry within the tool(s) 110 amplifies, samples and digitizes the tool's information signals for transmission and communicates them to the surface equipment 150 via the cable 112. Electrical power and control signals for coordinating operation of the tool 110 are generated by the surface equipment 150 and communicated via the cable 112 to circuitry provided within the tool 110. The surface equipment includes processor subsystem 170 (which can typically include a microprocessor, memory, clock and timing, and input/output functions—not separately shown), standard peripheral equipment (not separately shown), and recorder 126.

In other embodiments, the logging tool(s) 110 can be conveyed in the fluid-filled open borehole 132 by other conveyance means, such as standard tubing, coiled tubing, a tractor, or other suitable means. Furthermore, the fluid-filled open borehole 132 need not be vertical and thus can be include one or more deviated or horizontal sections. It can also be part of a multilateral well.

Figure 2A:
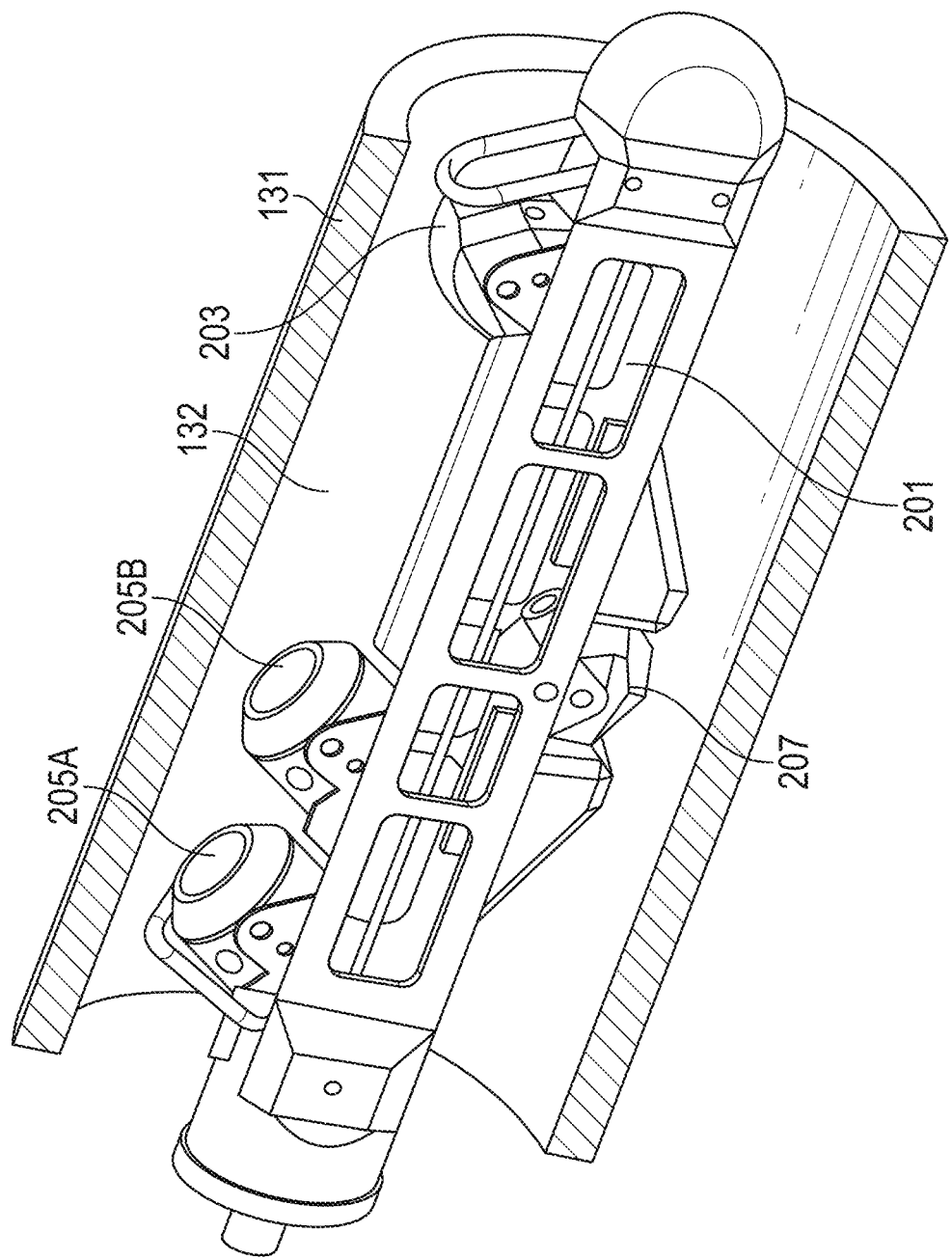
FIG. 2A is a schematic diagram of an ultrasonic logging tool (such as Schlumberger's ISOLATION SCANNER™ tool) that performs ultrasonic measurements in a fluid-filled open borehole.

In embodiment(s), the logging tool(s) 110 can include the ISOLATION SCANNER™, a wireline downhole tool commercially available from Schlumberger, which can be configured to carry out two different ultrasonic (high-frequency) measurements: a pulse-echo measurement, and a pitch-catch flexural wave measurement. FIG. 2A is a schematic illustration of the ISOLATION SCANNER™, which includes a transmitter 203 and two receivers 205A, 205B arranged in a pitch-catch path as well as a transceiver 207 located opposite the pitch-catch path as shown.

The transceiver 207 can be configured to perform a pulse-echo measurement within the fluid-filled open borehole 132. For the pulse-echo measurement, the transceiver 207 emits an acoustic beam pulse at normal incidence to the borehole wall and receives the return echo as shown in FIG. 2B. The return echo signal can be used to estimate tool eccentricity in the open borehole 132.

The transmitter 203 and two receivers 205A, 205B can be configured to perform a pitch-catch measurement with the fluid-filled open borehole 132. The pitch-catch measurement is performed at 180 degrees relative to the pulse-echo measurement as evident from the arrangement of the pitch-catch path of the transmitter 203 and two receivers 205A, 205B relative to the transceiver 207 as shown in FIGS. 2A and 2B. For the pitch-catch measurement, the transmitter 203 and the far and near receivers 205A, 205B cooperate to excite and receive compressional and shear waves that travel along the interface of the borehole wall and the formation 131 as shown in FIG. 2B. The arrival of the compressional waves at the far and near receivers 205A, 205B can be recorded as P arrivals. The compressional waves take longer to arrive at the far receiver 205A as compared to the near receiver 205B. The time distance between P arrivals divided by the distance traveled is known as $\Delta t_c$, or DTc or compressional slowness, and is the reciprocal of the speed of the compressional waves or $V_p$. The arrival of the shear waves at the far and near receivers 205A, 205B can be recorded as S arrivals. The shear waves take longer to arrive at the far receiver 205A as compared to the near receiver 205B. The time distance between S arrivals divided by the distance traveled is known as $\Delta t_s$, or DTs or shear slowness, and is the reciprocal of the speed of the shear waves or $V_s$.

To optimally excite the compressional and shear waves that travel along the interface of the borehole wall and the formation 131, the pitch-catch transmitter 203 and receivers 205A, 205B can be aligned at the phase matching angle θ with respect to the normal to the borehole wall, where the phase matching angle θ is given by arcsin (formation slowness/borehole fluid slowness).

The ISOLATION SCANNER™ can be conveyed within the open borehole 132 as depicted by the arrow of FIG. 2C such it performs the pulse-echo measurement and/or pitch catch measurement at different azimuthal directions. In embodiments, the conveyance of the ISOLATION SCANNER™ can follow a helical path that involves both axial movement and rotational movement in the open borehole 132. In this configuration, the pulse-echo measurement and/or pitch catch measurement can be performed at different azimuthal directions θ and axial depths z within the fluid-filled open borehole 132.

Figure 3A:
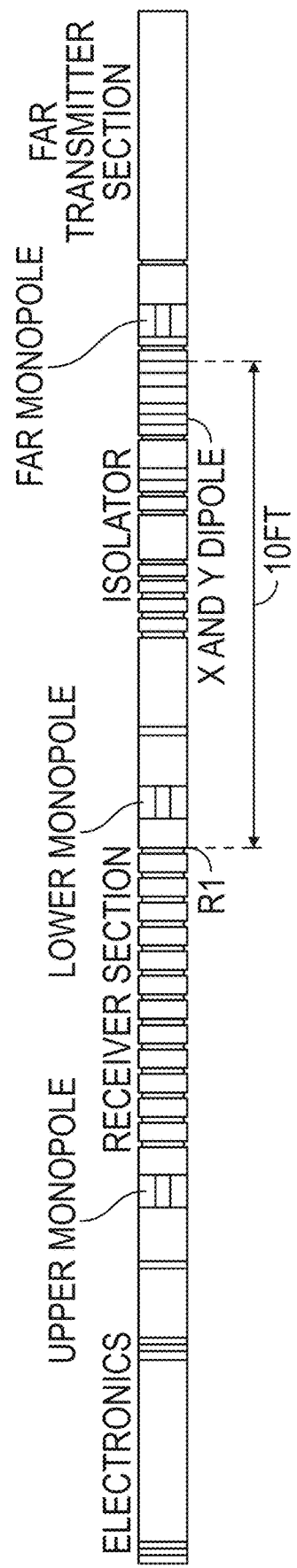
FIGS. 3A and 3B are schematic diagrams of a sonic logging tool (such as Schlumberger's SONIC SCANNER™ tool) that performs sonic measurements in a fluid-filled open borehole.
Figure 3B:
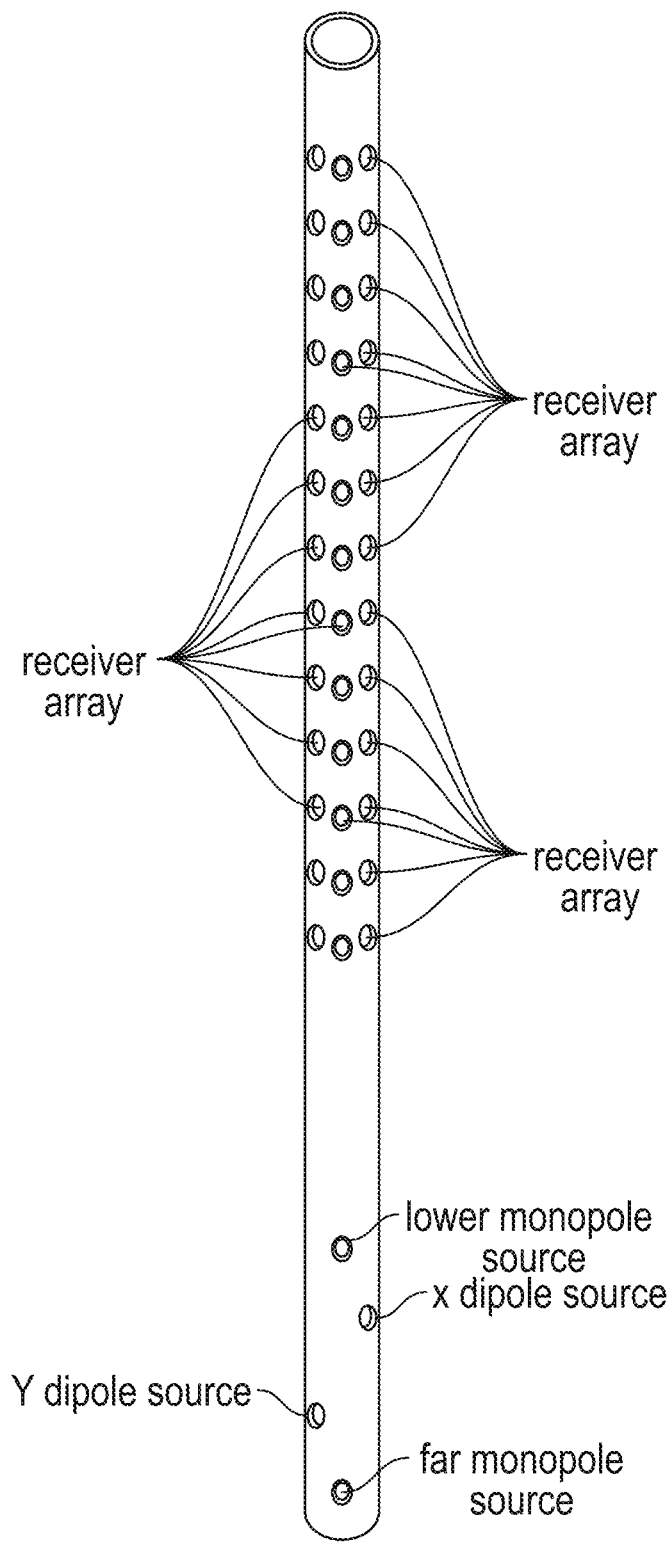

In embodiment(s), the logging tool(s) 110 can also include the SONIC SCANNER™, a wireline downhole tool commercially available from Schlumberger, which can be configured to carry out a number of different sonic (low-frequency) measurements as a function of azimuthal direction θ and axial depth z within the open borehole 132. FIGS. 3A and 3B shows a schematic diagram of the SONIC SCANNER™ tool. The SONIC SCANNER® tool includes a multiplicity of acoustic sources (including far, lower and upper monopole sources as well an X and Y dipole sources) and an array of axially and azimuthally distributed receivers that can be configured to excite and detect multiple borehole modes. These modes include a monopole mode that can be excited both at low and high frequencies and with far and near (with respect to the receiver array) monopole sources, a dipole mode that can be excited at two orthogonal directions yielding cross-dipole excitations, and a quadrupole mode for excitation at four orthogonal directions. The bandwidth of the acoustic sources typically ranges from a 500 Hz to 20 kHz. The monopole mode primarily generates the lowest-order axisymmetric mode, also referred to as the Stoneley mode, together with compressional and shear head waves. In contrast, the dipole mode primarily excites the lowest-order flexural borehole mode or flexural waves together with compressional and shear head waves. The head waves are caused by the coupling of the transmitted acoustic energy to plane waves in the formation that propagate along the borehole axis. An incident compressional head wave in the borehole fluid that meets the open borehole wall can produce a compressional head wave (or P-wave) and a shear head wave (or S-wave) that are transmitted (or refracted) through the interface and travel in the formation.

The compressional head wave travels in the formation at speed $V_p$ and involves particle oscillation in the direction of wave propagation. Once the refracted compressional head wave becomes parallel to the borehole wall, it propagates along the borehole-formation interface at speed $V_p$. The arrival of the refracted compressional head wave can be recorded as the P arrival. The refracted compressional head wave takes longer to arrive at the hydrophone receivers that are farther from the acoustic source. The time distance between P arrivals divided by the distance traveled is known as $\Delta t_c$, or compression slowness, and is the reciprocal of the speed $V_p$.

The shear head wave travels in the formation at speed $V_s$ and involves particle oscillation in the direction orthogonal to wave propagation. The behavior of the refracted shear head wave is similar to that of the refracted compressional head wave. Once the refracted shear head wave becomes parallel to the borehole wall, it propagates along the borehole-formation interface as a shear disturbance at speed $V_s$. The arrival of the refracted shear head wave can be recorded as the S arrival. The refracted shear head wave takes longer to arrive at receivers that are farther from the acoustic source. The time distance between S arrivals divided by the distance traveled is known as $\Delta t_s$, or DTs or shear slowness, and is the reciprocal of the speed $V_s$.

In a homogeneous and isotropic model of fast formations, the monopole mode can be used to generate compressional and shear head waves for determining the formation compressional and shear wave velocities and slownesses. Specifically, the compressional and shear wave velocities and slownesses can be estimated in a robust way using a signal-processing technique that looks for similarity—known mathematically as semblance or coherence—in waveforms across the receiver array.

It is known that refracted shear head waves cannot be detected in slow formations (where the shear wave velocity $V_s$ is less than the borehole-fluid compressional velocity) with receivers placed in the borehole fluid. In slow formations, the dipole mode is used to excite flexural waves along with compressional and shear head waves. The SONICSCANNER™ tool employs two dipole sources oriented orthogonally along the tool X- and Y-axes in order to generate the flexural waves. In this configuration, the X-dipole source and the Y-dipole source are fired sequentially, which is commonly referred to as a cross-dipole excitation. In this case, the X-dipole source is fired first, and the resulting flexural waveform is recorded. Then, the Y-dipole is fired, and another resulting flexural waveform is recorded. These flexural wave travel along the borehole wall in the plane of the dipole source that generated it. The flexural waves travel into the formation to a depth that depends on frequency where lower frequency flexural waves travel deeper into the formation than higher frequency flexural waves. The particle motion of the flexural wave is orthogonal to the direction of wave propagation, similar to the shear head wave. Flexural wave slowness is related to shear slowness. Extracting shear slowness from flexural wave data is a multistep process. More specifically, flexural waves are dispersive, meaning their slowness varies with frequency. In many sets of flexural waveforms, it is possible to see the wave shape change across the receiver array as different frequency components propagate at different speeds. Because the wave shape changes across the receiver array, standard methods for estimating slowness can be adapted to handle dispersive flexural waves. For example, dispersive STC processing identifies the slowness of individual frequency components. A plot of flexural wave slowness versus frequency is called a dispersion curve. At zero frequency, flexural wave slowness is the true formation slowness. In this manner, slowness and velocity of the formation can be obtained from the low-frequency asymptote of the dispersion curve.

The spatial alignment of mineral grains, layers, fractures or stress causes wave velocity to vary with direction, a property called anisotropy. The natural processes that cause anisotropy also cause it to have one of two main orientations: horizontal or vertical. To a first approximation, horizontal layers create an anisotropic medium that may be considered isotropic in all horizontal directions, but anisotropic vertically. Such a medium is known as transversely isotropic with a vertical axis of symmetry (TIV). Similarly, vertical fractures create a medium that may be considered isotropic in any direction aligned with the fracture planes, and anisotropic in the direction orthogonal to the fracture planes. This medium is known as transversely isotropic with a horizontal axis of symmetry (TIH).

Acoustic waves are sensitive to anisotropy. Acoustic waves travel faster when the direction of particle motion (called polarization) is parallel to the direction of greatest stiffness. Compressional head waves have particle motion in the direction of propagation, so compressional head waves travel fastest in directions parallel to layering in a TIV formation and parallel to fractures in a TIH formation, and the compressional head waves travel slower in directions perpendicular to layering in a TIV formation and perpendicular to fractures in a TIH formation. Shear head waves have particle motion perpendicular to the direction of propagation. In an isotropic medium, the particle motion of the shear head waves is contained in the plane containing the raypaths of the compressional and shear head waves. In an anisotropic medium (including TIV and TIH formations), the shear head wave splits into two shear components with different polarizations and different velocities. The shear wave component polarized parallel to the layering in a TIV formation or parallel to fractures in a TIH formation (which is referred to as the "fast shear component") travels faster than the shear wave component polarized perpendicular to the layering in a TIV formation or perpendicular to fractures in a TIH formation (which is referred to as the "slow shear component"). Flexural waves behave like shear waves so they split into fast and slow flexural components in the same ways.

For adequate detection of the fast and slow flexural components that are excited in the anisotropic medium, the SONIC SCANNER™ tool includes at least one dipole receiver that is aligned with each dipole source. At each firing of the respective dipole source, signals are recorded by the dipole receiver oriented "inline" with that dipole source and also by the dipole receiver oriented "offline" with that dipole source. Variation in azimuthal direction θ of the fast and slow flexural components (which is analogous to the variation in azimuthal direction θ of the fast and slow shear components) can be seen in the data of a cross-dipole log and/or the data of a dispersion curve.

The data for the cross-dipole log can be created by the Alfred rotation method, which rotates raw cross-dipole waveforms detected by the "inline" and "offline" dipole receivers to derive fast and slow dipole waveforms that are consistent with the directions of maximum and minimum offline energy. The Alfred rotation method is described in the article by Alfred, entitled "Shear Data in the Presence of Azimuthal Anisotropy: Dilley, Tex.," Expanded Abstracts, $56^{th}$ SEG Annual International Meeting, Houston, Nov. 2-6, 1986, pgs. 476-479. An overlay of the fast and slow dipole waveforms (or frequency components thereof) can show shear splitting or divergence due to stress-induced shear anisotropy. Large stress-induced shear anisotropy caused by biaxial horizontal stresses in the plane perpendicular to the borehole axis can be indicative of potential near-wellbore mechanical damage, such as a tensile fracture or breakout. Shear isotropy is indicative of a stable borehole and can be confirmed with little or no shear splitting in the fast and slow dipole waveforms.

The data for the dispersion curve provides an estimate of the slowness for the dispersive fast and slow flexural components (which is analogous to the slowness of the fast and slow shear components) as a function of frequency. The data for the dispersion curve can be created by frequency-based methods that digitize the cross-dipole waveforms, convert the discrete time waveforms to the frequency domain with the fast Fourier transform, and then process the frequency-domain waveforms for the estimation of slowness and associated dispersion. Both narrowband and broadband approaches can be used. In a narrowband approach, the slowness is estimated independently from one frequency to another. Prony's method and the modified matrix pencil method (MP, also referred to as the TKO method in the industry) belong to this category. Specifically, these two methods are based on a parametric assumption that the borehole acoustic mode at a given frequency can be modeled as the superposition of multiple exponential functions. Prony's method is described in the article by S. W. Lang et al., entitled "Estimating Slowness Dispersion from Arrays of Sonic Waveforms," 52 GEOPHYSICS, pg. 530-544, 1989. The TKO method is described in the article by Enkstrom entitled "Dispersion Estimation from Borehole Acoustic Arrays Using a Modified Matrix Pencil Algorithm," Conference Record of The Twenty-Ninth Asilomar Conference on Signals, Systems and Computers, 1995, Vol 1, Pgs. 449-453. Non-parametric narrowband methods can also be used. For example, a coherency maximization method has been proposed that can only identify one mode (the strongest one) at a given frequency. In another example, the amplitude and phase estimation (APES) method has been used. The APES method first computes the qualitative fitness function over the slowness domain at a given frequency and then uses a peak finding algorithm with a preset peak/mode number to obtain the quantitative slowness estimates. Conversely, in a broadband approach, array data is collected from a chosen frequency band, instead of a single frequency point, and simultaneously estimates the phase and group slownesses from the broadband array data. With more data processed at a time, the broadband approach is able to deliver smooth slowness estimates with small fluctuations from one frequency to another, high-resolution slowness estimates, and robust performance at low signal-to-noise ratio (SNR). The broadband ML method and the group LASSO method fall into this category. At zero frequency, flexural wave slowness is the true formation slowness. In this manner, the fast and slow slownesses and velocities of the formation can be obtained from the low-frequency asymptotes of the dispersion curve. Azimuthal variations in the fast and slow shear slownesses as a function of frequency as provided by the dispersion curve data can be an indicator that stress-induced shear anisotropy is present in the formation and can also be used to estimate the biaxial horizontal stresses in the plane perpendicular to the borehole axis and identify conditions indicative of potential near-wellbore mechanical damage, such as a tensile fracture or breakout.

FIGS. 4A to 4D illustrate waveforms acquired by the SONIC SCANNER™ tool from a fast formation offshore Norway. FIG. 4A illustrates the waveforms acquired from the monopole mode at high frequencies, which shows the compressional (P-) head waves, shear (S-) head waves and Stoneley waves that are excited and detected by the tool. FIG. 4B illustrates the waveforms acquired from the monopole mode at low frequencies, which shows the Stoneley waves that are predominately excited and detected by the tool. FIGS. 4C and 4D illustrate the flexural waveforms acquired from the dipole mode. FIG. 4C illustrates the flexural waveforms recorded at the X receivers, and FIG. 4D illustrates the flexural waveforms recorded at the Y receivers. Note that the receivers of the SONIC SCANNER™ tool are distributed both axially and azimuthally as best shown in FIG. 3B. Thus, the waveforms of FIGS. 4A to 4D show both the axial and azimuthal variation of the compressional (P-) head waves, shear (S-) head waves, Stoneley waves and flexural waves that are excited and detected by the tool. FIG. 4E is a dispersion curve showing slowness versus frequency for the nondispersive shear and slightly dispersive Stoneley arrivals of the monopole mode waveforms of FIGS. 4A and 4B together with the highly dispersive flexural arrivals of the dipole mode waveforms of FIGS. 4C and 4D. The compressional wave is excited only at frequencies higher than 8 KHz in this formation, and is not shown in the dispersion curve.

The present disclosure describes a workflow to identify layers in an anisotropic formation that are subject to stress-induced shear anisotropy due to differences between maximum horizontal stress $SH_{max}$ and minimum horizontal stress $SH_{min}$, and to estimate the magnitude of the maximum horizontal stress $SH_{max}$ when the overburden stress and minimum horizontal stress $SH_{min}$ are known from conventional methods. Linear and nonlinear constants, which are referred to a local reference state, can be used to describe the mechanical properties of the rock that have correlations with rock strength and fracturability. The workflow uses data acquired by low-frequency sonic measurements and high-frequency ultrasonic measurements inside a fluid-filled open borehole traversing the anisotropic formation.

Figure 5:
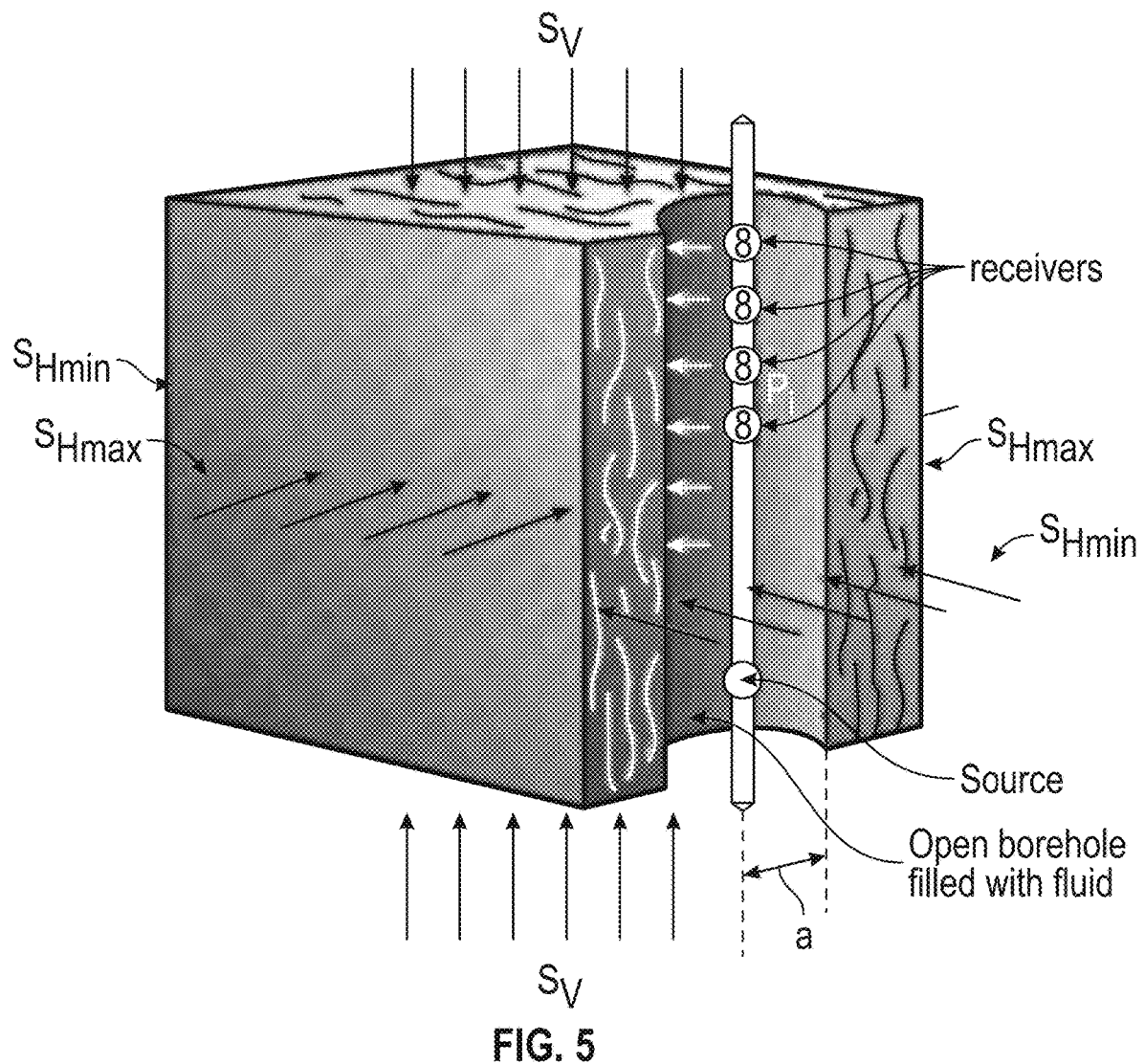
FIG. 5 is a schematic diagram of a pressurized fluid-filled open borehole surrounded by a formation subject to triaxial stresses: overburden stress $S_v$, maximum horizontal stress $SH_{max}$, and minimum horizontal stress $SH_{min}$.
Figure 6:
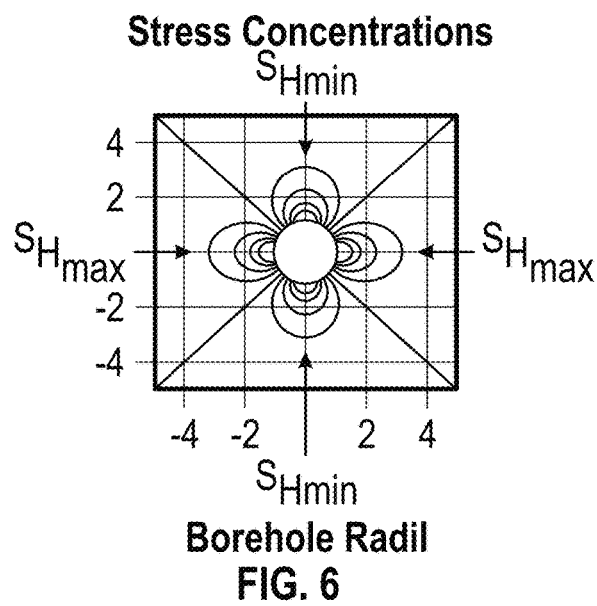
FIG. 6 displays near well-bore stress concentrations caused by the difference between the maximum and minimum horizontal stresses ($SH_{max}-SH_{min}$) at distances far away (r>6a) from the borehole of radius a. High frequency ultrasonic measurements with a shallow depth of investigation can detect stress-induced shear anisotropy due to the near well-bore stress concentrations in terms of azimuthal variations of compressional and shear slownesses or velocities.
Figure 7A:
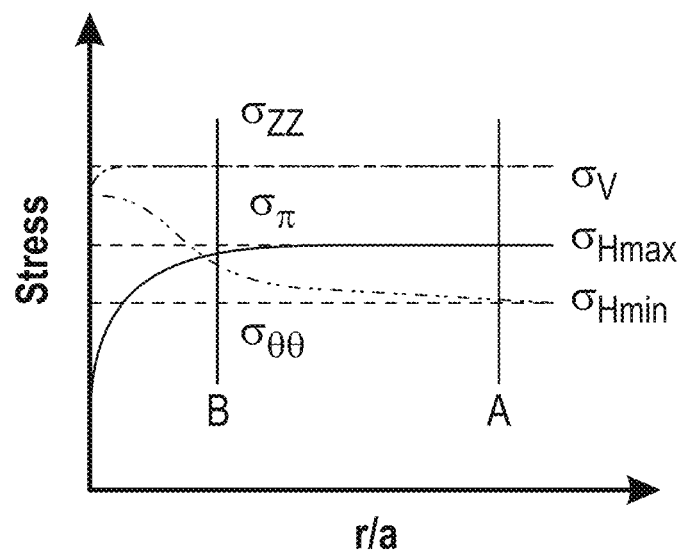
FIG. 7A depicts near-wellbore stress concentrations parallel to the direction of the maximum horizontal stress direction.
Figure 7B:
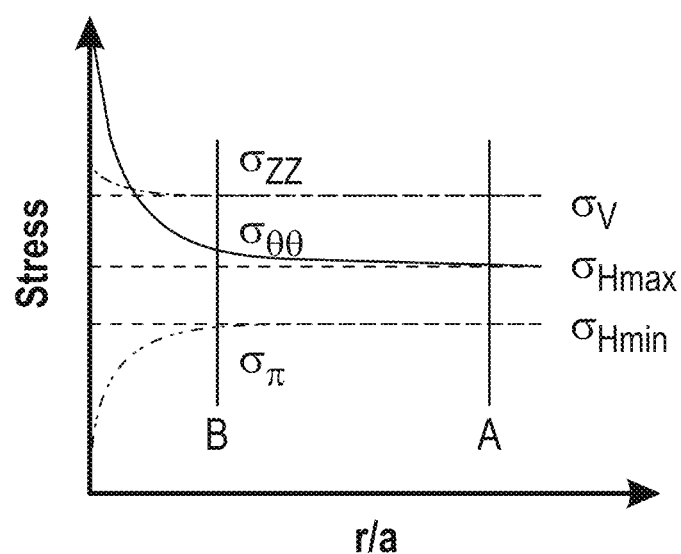
FIG. 7B shows near-wellbore stress concentrations perpendicular to the maximum horizontal stress direction. The low-frequency component of the dipole shear slowness can experience a shear splitting signature that is dependent on far-field differences in the effective horizontal stresses ($\sigma_{Hmax}-\sigma_{Hmin}$) provided that $c_{144} \neq c_{155}$. The high-frequency ultrasonic measurements readily identify azimuthal variations in the compressional and shear slownesses or velocities close to the borehole surface where differences between the radial and hoop stresses are magnified because of stress concentrations.

FIG. 5 is a schematic diagram of a pressurized fluid-filled open borehole surrounded by a formation subject to triaxial stresses: overburden stress $S_v$, maximum horizontal stress $SH_{max}$, and minimum horizontal stress $SH_{min}$. The SONIC SCANNER™ tool of FIGS. 3A and 3B is shown within the fluid-filled borehole and surrounded by the formation. The presence of the borehole causes stress concentrations close to the borehole surface. Stress-induced shear anisotropy is caused by the difference in the maximum horizontal stress $SH_{max}$ and minimum horizontal stress $SH_{min}$ in the plane perpendicular to the borehole axis as shown in FIG. 5. FIG. 6 is a contour polar plot of the sum of the principal stresses in the plane perpendicular to the borehole axis, and thus displays the near well-bore stress concentrations caused by the difference between the maximum and minimum horizontal stresses ($SH_{max}$–$SH_{min}$) at distances far away (r>6a) from the borehole of radius a. FIG. 7A is an illustrative plot showing near-wellbore stress concentrations parallel to the direction of the maximum horizontal stress direction. FIG. 7B is an illustrative plot showing near-wellbore stress concentrations perpendicular to the maximum horizontal stress direction.

Note that for certain rock types (specifically those rock types whose third order elastics constants $c_{144}$ and $c_{155}$ are substantially different from one another such that $c_{144} \neq c_{155}$), one or more low frequency components (e.g., frequency components less than 4 kHz) of the fast and slow dipole waveforms determined from the sonic measurements can have a shear splitting signature that is dependent in the far field differences in the effective horizontal stresses ($\sigma_{Hmax}$–$\sigma_{Hmin}$) of the formation.

However, in other rock types (specifically those rock types whose third order elastics constants $c_{144}$ and $c_{155}$ are substantially equal to one another such that $c_{144}=c_{155}$), such low frequency components lack the shear splitting signature that is dependent on the far field differences in the effective horizontal stresses ($\sigma_{Hmax}$–$\sigma_{Hmin}$) of the formation. Formation rock belonging to this rock type includes interbedded carbonate layers in organic-shale reservoirs. In this case, high frequency components (e.g., frequency components greater than 4 kHz) of the fast and slow dipole waveforms can experience the shear splitting signature due to the far field differences in the effective horizontal stresses ($\sigma_{Hmax}$–$\sigma_{Hmin}$) of the formation when the stress-induced shear anisotropy dominates over other sources of formation anisotropy. This condition (i.e., the condition that stress-induced shear anisotropy dominates over other sources of formation anisotropy) can be detected by analysis of azimuthal variations of compressional and shear slownesses or velocities determined from high frequency ultrasonic measurements with a shallow depth of investigation.

Figures 8A, 8B, 8C, 8D:
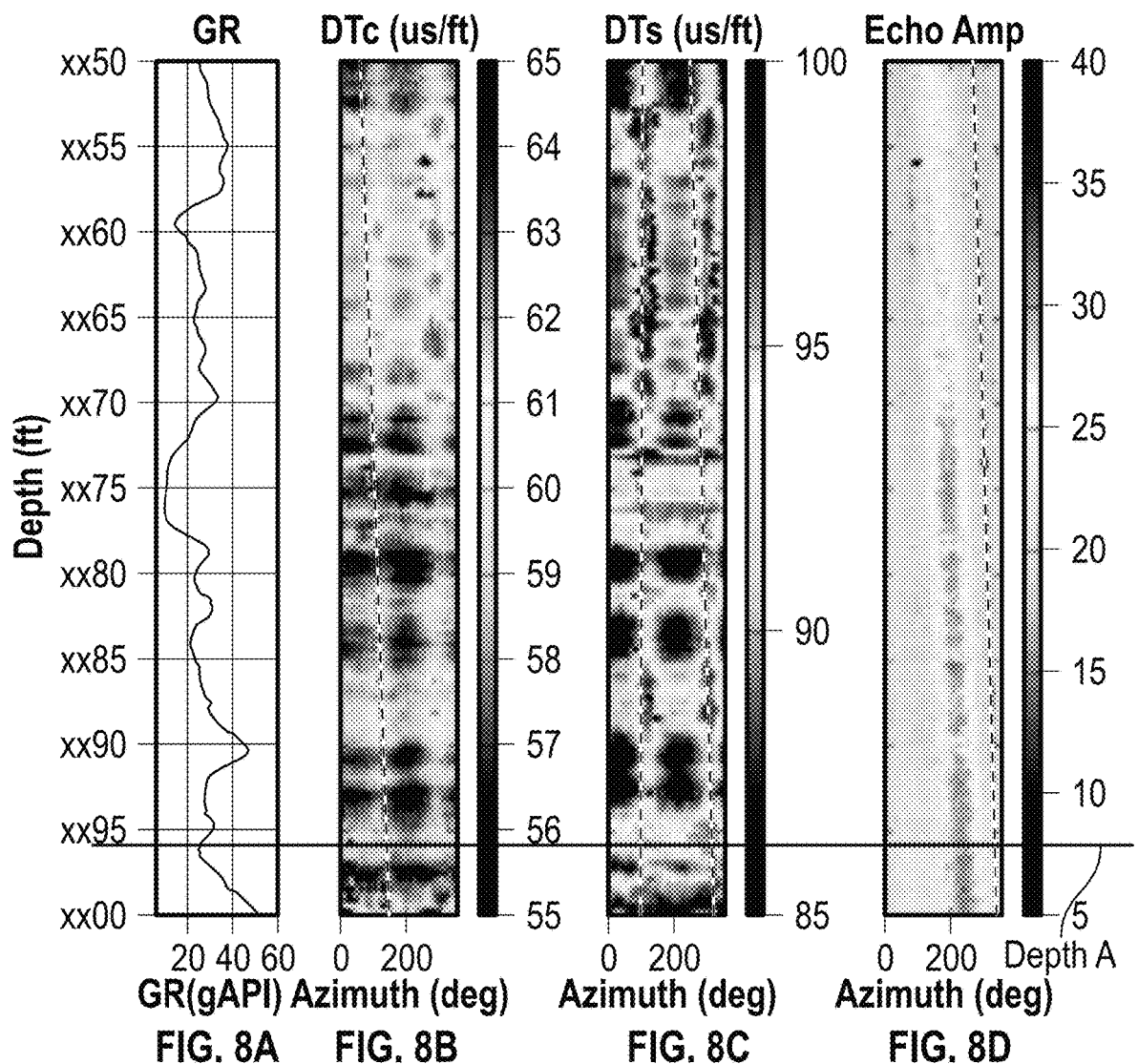
FIGS. 8A to 8D are composite logs of natural gamma-rays, compressional and shear slownesses, and echo amplitude over an interval of a representative borehole. It shows compressional (DTc) and shear (DTs) slowness as a function of azimuthal direction in the presence of non-uniform borehole stress concentrations caused by the far-field ($SH_{max}-SH_{min}$) as measured by the ultrasonic tool of FIGS. 2A and 2B.

FIGS. 8A to 8D are composite logs of natural gamma-rays, compressional and shear slownesses, and echo amplitude over an interval of a representative borehole. FIGS. 8B and 8C show the variations in the compressional (DTc) and shear (DTs) velocities as a function of azimuthal direction over the borehole interval as determined from high frequency ultrasonic (pitch-catch) measurements with a shallow depth of investigation carried out by the ISOLATION SCANNER™ tool of FIGS. 2A and 2B within the borehole. The high frequency ultrasonic (pitch-catch) measurements with a shallow depth of investigation excite and detect compressional and shear waveforms in the presence of non-uniform borehole stress concentrations caused by the far-field difference between the maximum and minimum horizontal stresses ($SH_{max}$–$SH_{min}$) in the borehole. Analysis of the azimuthal variations of compressional and shear slownesses or velocities determined from high frequency ultrasonic measurements with a shallow depth of investigation can be used to detect the condition that stress-induced shear anisotropy dominates over other sources of formation anisotropy.

The workflow described herein estimates horizontal stresses from azimuthal variations in the compressional and shear slownesses or velocities measured at shallow depth of investigation near the borehole wall (e.g., at a radial dimension r=1.1a). The theory underlying this workflow is based on acoustoelastic effects in rocks. Acoustoelsticity in rocks refers to changes in elastic wave velocities caused by changes in the prestressed rock in the propagating medium. Plane elastic wave propagation in a prestressed rock can be described by equations of motion for small dynamic fields superposed on a statically deformed state of the material as set forth below. These equations are derived from the rotationally invariant equations of nonlinear elasticity and account for changes in the effective elastic stiffnesses, mass density, and kinematics of deformation caused by the application of static stresses as described in i) B. K. Sinha, "Elastic Waves in Crystals under a Bias," Ferroelectrics, 41, pp. 61-73, 1982; and ii) A. N. Norris, B. K. Sinha, and S. Kostek, "Acoustoelasticity of Solid/Fluid Composite Systems," Geophysical Journal International, vol. 118, pp. 439-446, August 1994.

With reference to a local cylindrical coordinate system where $x_1$ is parallel to the r direction, $x_2$ coincides with the $\theta$ direction, and $x_3$ is parallel to the z-direction, effective elastic stiffnesses $c_{ij}$ in a prestressed rock can be expressed as $$c_{ij} = c_{ij0} + \Delta c_{ij}, \quad (1)$$

where $c_{ij0}$ denotes the elastic stiffnesses in a local reference state and $\Delta c_{ij}$ denotes stress-induced changes in the elastic moduli above and beyond those assumed in the reference state and can be expressed as $$\Delta c_{11}(r, \theta) = \frac{c_{111}(2(\lambda+\mu)\Delta\sigma_{rr} - \lambda(\Delta\sigma_{zz} + \Delta\sigma_{\theta\theta})) + c_{112}(-2\lambda\Delta\sigma_{rr} + (\lambda+2\mu)(\Delta\sigma_{zz} + \Delta\sigma_{\theta\theta}))}{2\mu(3\lambda+2\mu)}, \quad (2)$$

$$\Delta c_{22}(r, \theta) = \frac{c_{112}((\lambda+2\mu)\Delta\sigma_{rr} + (\lambda+2\mu)\Delta\sigma_{zz} - 2\lambda\Delta\sigma_{\theta\theta}) - c_{111}(\lambda\Delta\sigma_{rr} + \lambda\Delta\sigma_{zz} - 2(\lambda+\mu)\Delta\sigma_{\theta\theta})}{2\mu(3\lambda+2\mu)}, \quad (3)$$

$$\Delta c_{33}(r, \theta) = \frac{-c_{111}(\lambda\Delta\sigma_{rr} - 2(\lambda+\mu)\Delta\sigma_{zz} + \lambda\Delta\sigma_{\theta\theta}) + c_{112}((\lambda+2\mu)\Delta\sigma_{rr} - 2\lambda\Delta\sigma_{zz} + (\lambda+2\mu)\Delta\sigma_{\theta\theta})}{2\mu(3\lambda+2\mu)}, \quad (4)$$

$$\Delta c_{44}(r, \theta) = \frac{c_{144}(2(\lambda+\mu)\Delta\sigma_{rr} - \lambda(\Delta\sigma_{zz} + \Delta\sigma_{\theta\theta})) + c_{155}(-2\lambda\Delta\sigma_{rr} + (\lambda+2\mu)(\Delta\sigma_{zz} + \Delta\sigma_{\theta\theta}))}{2\mu(3\lambda+2\mu)}, \quad (5)$$

$$\Delta c_{55}(r, \theta) = \frac{c_{155}((\lambda+2\mu)\Delta\sigma_{rr} + (\lambda+2\mu)\Delta\sigma_{zz} - 2\lambda\Delta\sigma_{\theta\theta}) - c_{144}(\lambda\Delta\sigma_{rr} + \lambda\Delta\sigma_{zz} - 2(\lambda+\mu)\Delta\sigma_{\theta\theta})}{2\mu(3\lambda+2\mu)}, \quad (6)$$

$$\Delta c_{66}(r, \theta) = \frac{-c_{144}(\lambda\Delta\sigma_{rr} - 2(\lambda+\mu)\Delta\sigma_{zz} + \lambda\Delta\sigma_{\theta\theta}) + c_{155}((\lambda+2\mu)\Delta\sigma_{rr} - 2\lambda\Delta\sigma_{zz} + (\lambda+2\mu)\Delta\sigma_{\theta\theta})}{2\mu(3\lambda+2\mu)}, \quad (7)$$

$$\Delta c_{12}(r, \theta) = \frac{-c_{123}(\lambda\Delta\sigma_{rr} - 2(\lambda+\mu)\Delta\sigma_{zz} + \lambda\Delta\sigma_{\theta\theta}) + c_{112}((\lambda+2\mu)\Delta\sigma_{rr} - 2\lambda\Delta\sigma_{zz} + (\lambda+2\mu)\Delta\sigma_{\theta\theta})}{2\mu(3\lambda+2\mu)}, \quad (8)$$

$$\Delta c_{13}(r, \theta) = \frac{c_{112}((\lambda+2\mu)\Delta\sigma_{rr} + (\lambda+2\mu)\Delta\sigma_{zz} - 2\lambda\Delta\sigma_{\theta\theta}) - c_{123}(\lambda\Delta\sigma_{rr} + \lambda\Delta\sigma_{zz} - 2(\lambda+\mu)\Delta\sigma_{\theta\theta})}{2\mu(3\lambda+2\mu)}, \quad (9)$$

$$\Delta c_{16}(r, \theta) = \frac{c_{155}\Delta\sigma_{r\theta}}{\mu}, \quad (10)$$

$$\Delta c_{23}(r, \theta) = \frac{c_{123}(2(\lambda+\mu)\Delta\sigma_{rr} - \lambda(\Delta\sigma_{zz} + \Delta\sigma_{\theta\theta})) + c_{112}(-2\lambda\Delta\sigma_{rr} + (\lambda+2\mu)(\Delta\sigma_{zz} + \Delta\sigma_{\theta\theta}))}{2\mu(3\lambda+2\mu)}, \quad (11)$$

$$\Delta c_{26}(r, \theta) = \frac{c_{155}\Delta\sigma_{r\theta}}{\mu}, \quad (12)$$

$$\Delta c_{36}(r, \theta) = \frac{c_{144}\Delta\sigma_{r\theta}}{\mu}, \quad (13)$$

$$\Delta c_{45}(r, \theta) = \frac{c_{456}\Delta\sigma_{r\theta}}{\mu}, \quad (14)$$

$$\Delta c_{14} = \Delta c_{15} = \Delta c_{24} = \Delta c_{25} = \Delta c_{34} = \Delta c_{35} = \Delta c_{46} = \Delta c_{56} = 0, \quad (15)$$

where $\lambda$ and $\mu$ are the Lamé parameters in the isotropic reference state and $c_{111}$, $c_{112}$, $c_{123}$, $c_{144}$, $c_{155}$ and $c_{456}$ are the third order elastic constants. Note that only three of them are independent rock properties in view of the following relationships $$c_{144} = \frac{c_{112} - c_{123}}{2}, \quad (16)$$

$$c_{155} = \frac{c_{111} - c_{112}}{4}, \quad (17)$$

$$c_{456} = \frac{c_{111} - 3c_{112} + 2c_{123}}{8}. \quad (18)$$

$\Delta\sigma_{rr}$, $\Delta\sigma_{\theta\theta}$, $\Delta\sigma_{r\theta}$, $\Delta\sigma_{zz}$ are the borehole stress distributions described by the Kirsch's equation in a cylindrical coordinate system r, $\theta$ and z $$\Delta\sigma_{rr} = \frac{a^2\Delta Pw}{r^2} + \left(1 + \frac{3a^4}{r^4} - \frac{4a^2}{r^2}\right)\left(\frac{1}{2}\cos 2\theta(\Delta\sigma_{hmax} - \Delta\sigma_{hmin})\right) + \frac{1}{2}\left(1 - \frac{a^2}{r^2}\right)(\Delta\sigma_{hmax} + \Delta\sigma_{hmin}), \quad (19)$$

$$\Delta\sigma_{\theta\theta} = -\frac{a^2\Delta Pw}{r^2}\left(1 + \frac{3a^4}{r^4}\right)\left(\frac{1}{2}\cos 2\theta(\Delta\sigma_{hmax} - \Delta\sigma_{hmin})\right) + \frac{1}{2}\left(1 + \frac{a^2}{r^2}\right)(\Delta\sigma_{hmax} + \Delta\sigma_{hmin}), \quad (20)$$

$$\Delta\sigma_{r\theta} = \left(-\frac{3a^4}{r^4} + \frac{2a^2}{r^2} + 1\right)\left(\frac{1}{2}(\Delta\sigma_{hmin} - \Delta\sigma_{hmax})\sin 2\theta\right), \quad (21)$$

$$\Delta\sigma_{zz} = \frac{a^2\nu(2\cos 2\theta(\Delta\sigma_{hmax} - \Delta\sigma_{hmin}))}{r^2} + \Delta\sigma_v, \quad (22)$$

where a denotes the borehole radius, and $\Delta\sigma_{hmax}$, $\Delta\sigma_{hmin}$, and $\Delta\sigma_v$ are the incremental deviatoric maximum horizontal stress, minimum horizontal stress and vertical stress from the reference state, and $\Delta Pw$ is the deviatoric wellbore pressure.

According to the acoustoelastic model derived from rotationally invariant equations of nonlinear elasticity as described above, difference between the shear moduli $c_{55}$ and $c_{44}$ can be expressed as:

$$c_{55} - c_{44} = A_E(\sigma_{hmax} - \sigma_{hmin}), \quad (23)$$

where $c_{55} = \rho v_{fs}^2$, $c_{44} = \rho v_{ss}^2$, $\sigma_{hmax}$ and $\sigma_{hmin}$ are the 2 horizontal stresses, and $A_E$ is the acoustoelastic coefficient defined as $$A_E = 2 + c_{456}/\mu. \quad (24)$$

Generally, differences in these dipole shear moduli are manifested by a low-frequency dipole-shear slowness splitting observed by standard processing of cross-dipole waveforms recorded by the sonic measurements (such as carried out through the Sonic Scanner™ tool as described above).

However, in certain types of rocks, it is possible to observe no shear slowness splitting (i.e., the lack of a shear splitting signature) at low frequencies, but the fast and slow shear slownesses differ (i.e., the presence of a shear splitting signature) at high frequencies. Since near-wellbore stress concentrations introduce a larger difference between the radial and hoop stresses, the high-frequency flexural waves with shallower radial depth of investigation exhibit discernible differences between their fast and slow shear slownesses. The overlay of fast- and slow-dipole flexural dispersions with no shear splitting signature at low frequencies together with a shear splitting signature at high frequencies implies:

$$c_{456} = 0, \text{ or} \tag{25}$$

$$c_{144} = c_{155}. \tag{26}$$

In this case, the three independent non-linear elastic constants ($c_{111}$, $c_{144}$, $c_{155}$) are now reduced to two non-linear elastic constants (i.e., $c_{111}$, $c_{155}$).

Given that $c_{144} = c_{155}$, changes in S-wave moduli from a reference hydrostatically loaded state (chosen to be the average of the three principal stresses) can be expressed as:

$$\Delta c_{55}(r, 0) = \frac{a^2 c_{155}(\sigma_{hmax} - \sigma_{hmin})}{r^2(\lambda + \mu)}, \tag{27}$$

$$\Delta c_{44}(r, \pi/2) = \frac{a^2 c_{155}(\sigma_{hmax} - \sigma_{hmin})}{r^2(\lambda + \mu)}. \tag{28}$$

Furthermore, changes in the P-wave moduli from a reference hydrostatically loaded state (chosen to be the average of the three principal stresses) can be expressed as $$\Delta c_{33}(r, 0) = \frac{a^2 C_{112}(-\sigma_{hmax} + \sigma_{hmin})}{r^2(\lambda + \mu)} \frac{2C_{155}(\sigma_{hmax} + \sigma_{hmin} - 2\sigma_v)}{3\mu}, \tag{29}$$

$$\Delta c_{33}(r, \pi/2) = \frac{a^2 C_{112}(\sigma_{hmax} + \sigma_{hmin})}{r^2(\lambda + \mu)} \frac{2C_{155}(\sigma_{hmax} + \sigma_{hmin} - 2\sigma_v)}{3\mu}. \tag{30}$$

Note that there is no requirement for $c_{144} = c_{155}$ with regard to equations (29) and (30).

Equations (27) and (28) can be combined to yield:

$$\Delta c_{55}(r, 0) \Delta c_{44}\left(r, \frac{\pi}{2}\right) = \frac{2a^2 c_{155}(-\sigma_{hmax} + \sigma_{hmin})}{(\lambda + \mu)r^2}, \tag{31}$$

$$\Delta c_{55}(r, 0) + \Delta c_{44}\left(r, \frac{\pi}{2}\right) = 0. \tag{32}$$

And equations (29) and (30) can be combined to yield:

$$\Delta c_{33}(r, 0) \Delta c_{33}\left(r, \frac{\pi}{2}\right) = \frac{2a^2 c_{112}(-\sigma_{hmax} + \sigma_{hmin})}{(\lambda + \mu)r^2}, \tag{33}$$

$$\Delta c_{33}(r, 0) + \Delta c_{33}\left(r, \frac{\pi}{2}\right) = \frac{4C_{155}(\sigma_{hmax} + \sigma_{hmin} - 2\sigma_v)}{3\mu}. \tag{34}$$

Note that equations (31) to (34) take only the azimuthal variation in the compressional and shear velocity data as inputs, which can be determined from high frequency ultrasonic measurements with a shallow depth of investigation (such as carried out through the Isolation Scanner™ tool as described above). By solving these four equations (31), (32), (33) and (34) and taking horizontal stresses as known values, the two nonlinear and two linear constants in the chosen reference state can be described by the following equations.

$$c_{112} = \tag{35}$$

$$\frac{3\left(c_{33}(r, 0) - c_{33}\left(r, \frac{\pi}{2}\right)\right)\left(c_{33}(r, 0) + c_{33}\left(r, \frac{\pi}{2}\right) - 2\mu\right)\mu r^2}{4\left(\left(3a^2\mu + \left(-c_{44}\left(r, \frac{\pi}{2}\right) + c_{55}(r, 0)\right)r^2\right)\sigma_{hmax} + (-3a^2\mu + \left(-c_{44}\left(r, \frac{\pi}{2}\right) + c_{55}(r, 0)\right)r^2\right)\sigma_{hmin} + 2\left(c_{44}\left(r, \frac{\pi}{2}\right) - c_{55}(r, 0)\right)r^2\sigma_v\right)},$$

$$c_{155} = \frac{c_{55}(r, 0) - c_{44}\left(r, \frac{\pi}{2}\right)}{c_{33}(r, 0) - c_{33}\left(r, \frac{\pi}{2}\right)} c_{112}, \tag{36}$$

$$\mu = \frac{c_{55}(r, 0) + c_{44}\left(r, \frac{\pi}{2}\right)}{2}, \tag{37}$$

$$\lambda = = \frac{-c_{44}\left(r, \frac{\pi}{2}\right)\mu r^2 + c_{55}(r, 0)\mu r^2 + 2a^2 C_{155}\sigma_{hmax} - 2a^2 C_{155}\sigma_{hmin}}{\left(c_{44}\left(r, \frac{\pi}{2}\right) - c_{55}(r, 0)\right)r^2} \tag{38}$$

Equations (35) to (38) can be used to obtain the relationship between the third-order elastic constants and horizontal stress magnitudes. Once these relationships are obtained, the sonic measurements of the fluid-filled open borehole (such as carried out through the Sonic Scanner™ tool as described above) can then be used to provide additional constraints on the stress estimates. For example, a cross dipole flexural dispersion match from numerical modeling provides one more conditions that can be used to estimate the third-order, nonlinear elastic constants as well as the difference between the horizontal stress magnitudes ($SH_{max} - SH_{min}$).

Figure 9A:
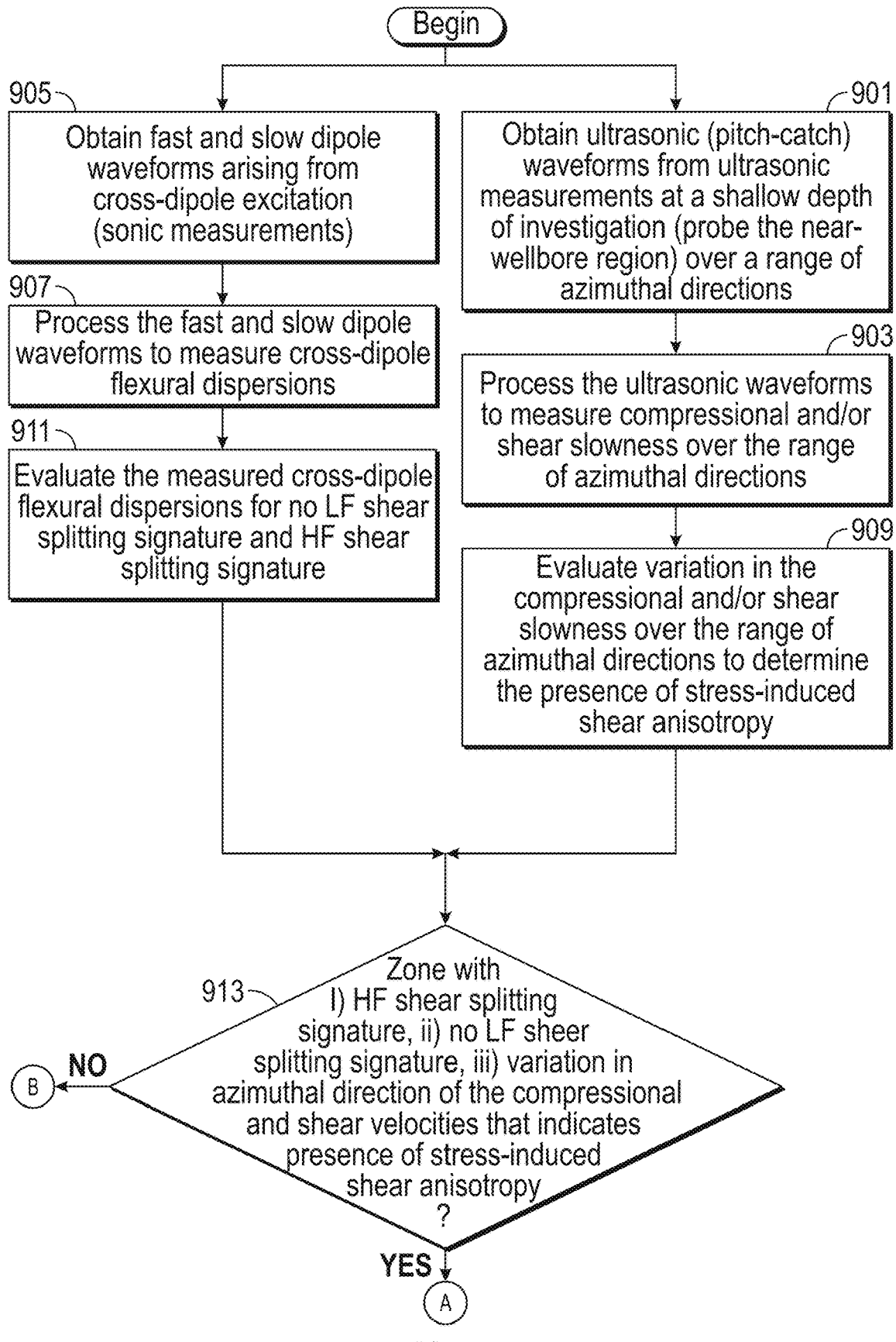
FIGS. 9A and 9B, collectively, is a flowchart of a workflow for the estimation of the magnitude of maximum horizontal stress $SH_{max}$ of an anisotropic formation (such as one or more thin layers interbedded in an organic-shale reservoir) using ultrasonic measurements and sonic measurements carried out by at least one acoustic tool in a fluid-filled open borehole that traverses the formation.
Figure 9B:
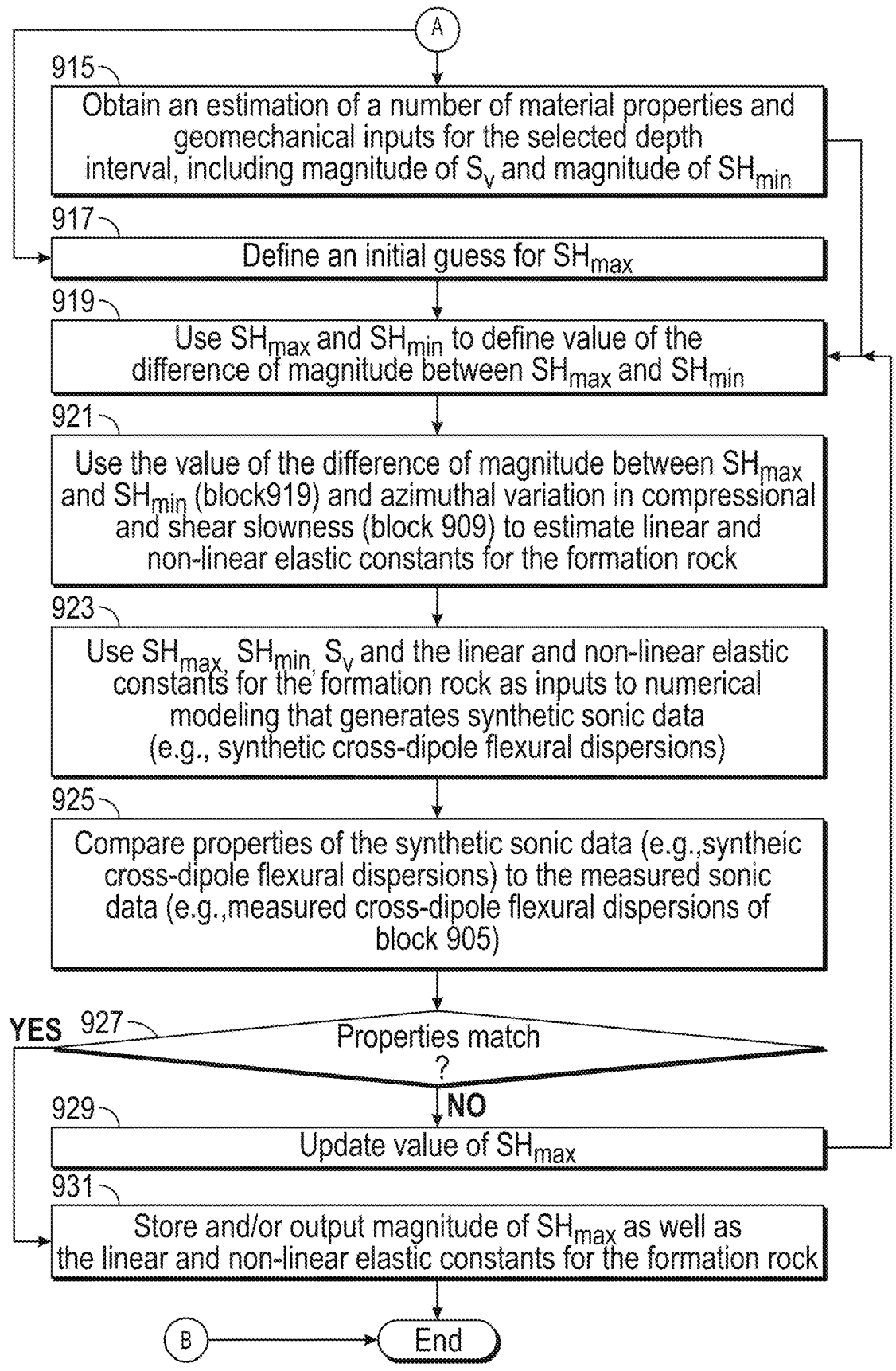

FIGS. 9A and 9B is a flow diagram of an illustrative workflow that identifies layers in an anisotropic formation that are subject to stress-induced shear anisotropy due to differences between maximum horizontal stress $SH_{max}$ and minimum horizontal stress $SH_{min}$, and to estimate the magnitude of the maximum horizontal stress $SH_{max}$ when the overburden stress and minimum horizontal stress $SH_{min}$ are known from conventional methods. The workflow can be carried out by a programmed processor, such as the processor subsystem 170 of FIG. 1 or a remote processor. If desired, a downhole processor that is part of the logging tool(s) can perform at least part of the workflow. Data may, for example, be collected and stored using the logging tool(s) of FIGS. 2A-4E, although it will be understood that other suitable equipment can be used as well. The workflow assumes the selection of a depth interval of a fluid-filled open borehole that traverses a formation of interest.

The workflow begins in block 901 where ultrasonic measurements (such as the pitch-catch measurements carried out by the Isolation Scanner™ tool as described herein) are performed over a range of azimuthal directions (e.g., covering azimuthal directions θ between 0 degrees and 360 degrees) within the fluid-filled open borehole at the selected depth interval. Such ultrasonic measurements obtain ultrasonic waveforms arising from ultrasonic compression and shear waves excited at a shallow depth of investigation over the range of azimuthal directions at the selected depth interval. These ultrasonic measurements probe the near-wellbore stress concentrations across the cross-sectional plane of the fluid-filled open borehole.

In block 903, the ultrasonic waveforms acquired over the range of azimuthal directions in block 901 are processed to measure compressional (DTc or $\Delta t_c$) slowness and/or shear (DTs or $\Delta t_s$) slowness over the range of azimuthal directions. The compressional (DTc or $\Delta t_c$) slowness can be measured from the time distance between P arrivals divided by the distance traveled as is well known. The shear (DTs or $\Delta t_s$) slowness can be measured from the time distance between S arrivals divided by the distance traveled as is well known.

In block 905, sonic measurements (such as those carried out by the Sonic Scanner™ tool as described herein) are performed to obtain fast and slow dipole waveforms arising from cross-dipole excitations in the depth interval of the fluid-filled open borehole. In embodiment(s), the fast and slow dipole waveforms can be created by the Alfred rotation method, which rotates raw cross-dipole waveforms detected by the "inline" and "offline" dipole receivers to derive fast and slow dipole waveforms that are consistent with the directions of maximum and minimum offline energy as described above. In embodiment(s), the ultrasonic measurements at the selected depth interval of block 901 can be performed in the same logging run as the sonic measurements at the selected depth interval performed in block 905. In other embodiment(s), the ultrasonic measurements at the selected depth interval of block 901 can be performed in a different logging run as the sonic measurements at the selected depth interval performed in block 905.

In block 907, the fast and slow dipole waveforms obtained in block 905 are processed to measure cross-dipole flexural dispersions (a dispersion curve). In embodiment(s), the data for the cross-dipole flexural dispersions can be created by frequency-based methods that digitize the fast and slow dipole waveforms, convert the discrete time waveforms to the frequency domain with the fast Fourier transform, and then process the frequency-domain waveforms for the estimation of slowness and associated dispersion. Both narrowband and broadband approaches can be used as described herein. In embodiment(s), the Prony's method or the modified matrix pencil method (MP, also referred to as the TKO method) can be used to measure the cross-dipole flexural dispersions.

Figure 11A:
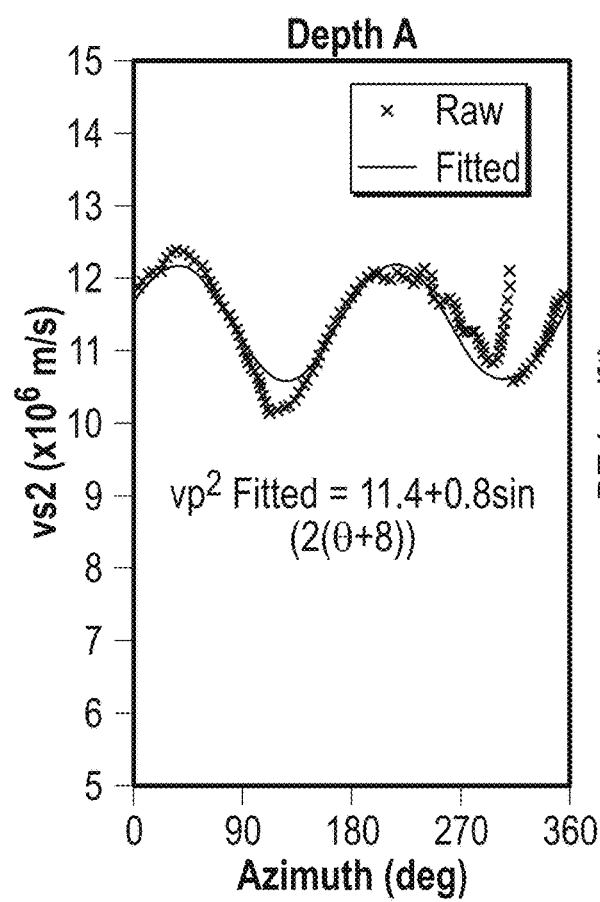
FIGS. 11A and 11B are plots of azimuthal variations of shear velocity squared ($V_s^2$) and shear slowness (DTs) in the cross-sectional plane of the borehole, which are determined by the ultrasonic measurements in the presence of non-uniform borehole stress concentrations caused by the far-field ($SH_{max}-SH_{min}$). Note that the azimuthal variation of ($V_s^2$) conforms to a sinusoidal variation, whereas the azimuthal variation of shear velocity $V_s$ alone does not.
Figure 11B:
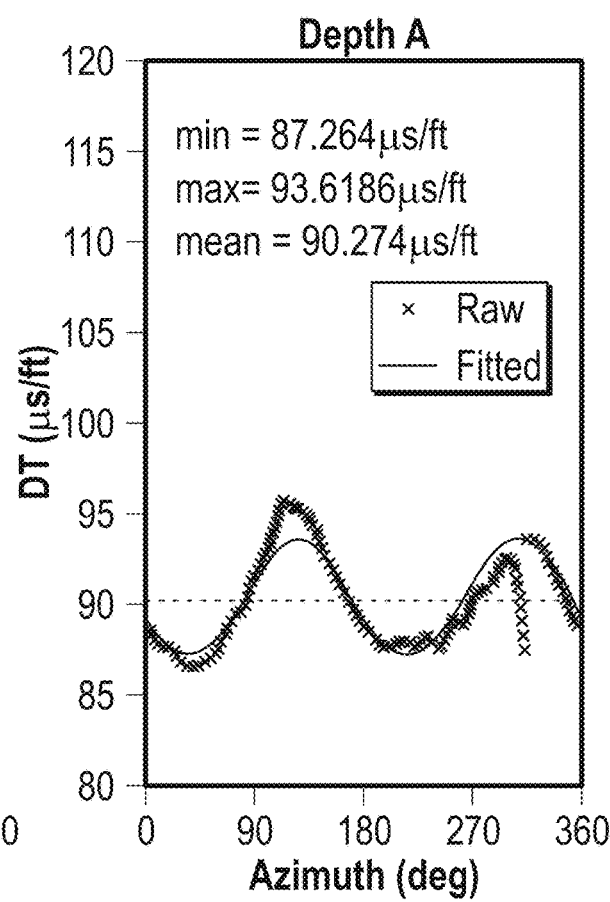

In block 909, the workflow evaluates variation in the compressional (DTc or $\Delta t_c$) slowness and/or shear (DTs or $\Delta t_s$) slowness over the range of azimuthal directions as measured in block 903 for indication of the presence of stress-induced shear anisotropy. In embodiment(s), the evaluation of the azimuthal variation in the compressional (DTc or $\Delta t_c$) slowness and/or shear (DTs or $\Delta t_s$) slowness can be performed using a sinusoidal function that relates slowness to azimuth. The sinusoidal function can be fit to the azimuthal variation in the compressional (DTc or $\Delta t_c$) slowness and/or shear (DTs or $\Delta t_s$) slowness measured in block 903. The fitting process can be accomplished by searching for three parameters of the sinusoidal function (including a slowness mean value, a slowness azimuthal variation and azimuthal phase angle) that minimizes a cost function. The cost function can be constructed by the difference between the sinusoidal function and the azimuthal variation in the compressional (DTc or $\Delta t_c$) slowness and/or shear (DTs or $\Delta t_s$) slowness measured in block 903. In embodiment(s), the sinusoidal function that relates slowness to azimuth can be a cosine function of the form cos 2θ for the azimuthal variation, which includes two peaks and two troughs as shown in the example plots of FIGS. 10B and 11B. This type of azimuthal variation in slowness can be used as the criterion to determine the presence of stress-induced shear anisotropy.

Alternatively, variation in the compressional velocity and/or shear velocity (which are the reciprocals of the compressional slowness and shear slowness) over the range of azimuthal directions can be evaluated for indication of the presence of stress-induced shear anisotropy. In embodiment(s), the evaluation of the azimuthal variation in the compressional velocity and/or shear velocity can be performed using a sinusoidal function that relates the square of velocity (velocity-squared) to azimuth. The sinusoidal function can be fit to the azimuthal variation in the square of the compressional velocity and/or shear velocity corresponding to the compressional (DTc or $\Delta t_c$) slowness and/or shear (DTs or $\Delta t_s$) slowness measured in block 903. The fitting process can be accomplished by searching for three parameters of the sinusoidal function (including a velocity-squared mean value, a velocity-squared azimuthal variation and azimuthal phase angle) that minimizes a cost function. The cost function can be constructed by the difference between the sinusoidal function and the azimuthal variation in the square of the compressional velocity and/or shear velocity corresponding to the compressional (DTc or $\Delta t_c$) slowness and/or shear (DTs or $\Delta t_s$) slowness measured in block 903. In embodiment(s), the sinusoidal function that relates velocity-squared to azimuth can be a cosine function of the form cos 2θ for the azimuthal variation, which includes two peaks and two troughs as shown in the example plots of FIGS. 10A and 11A. This type of azimuthal variation in velocity-squared can be used as the criterion to determine the presence of stress-induced shear anisotropy.

In block 911, the workflow evaluates the measured cross-dipole flexural dispersions of block 905 to identify a zone (e.g., one or more layers of the formation within the depth interval) with no low-frequency shear splitting signature and with a high-frequency shear splitting signature. In embodiment(s), the lack of a low-frequency shear splitting signature for the zone is satisfied when there is little or no difference in the fast and slow shear velocities for the zone at one or more low frequencies (such as one or more frequencies less than 4 kHz). In embodiment(s), the presence of a high-frequency shear splitting signature for the zone is satisfied when there is a difference in the fast and slow shear velocities for the zone at one or more high frequencies (such as one or more frequencies greater than 4 kHz). Other suitable low and high frequency ranges can be used if desired.

Note that the particular frequency range for the low frequency components that is used to evaluate the presence of the low frequency shear splitting signature in block 911 as well as the particular frequency range for the high frequency components that is used to evaluate the presence of the high frequency shear splitting signature in block 911 can be varied or adjusted on a case by case basis, if need be.

Figure 12B:
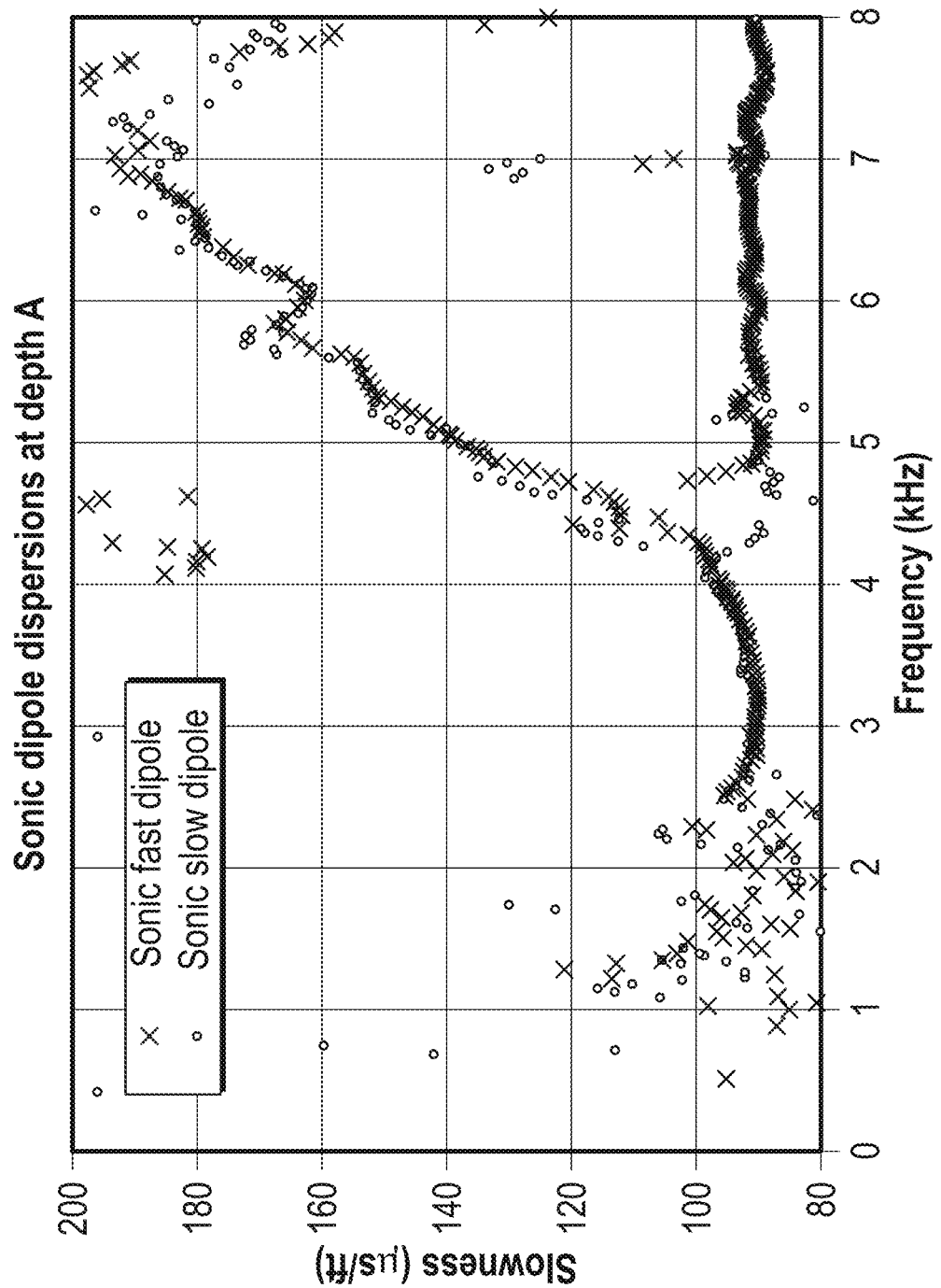
FIG. 12B shows the fast and slow dipole flexural dispersions at the depth A obtained after processing of cross-dipole waveforms recorded by the sonic measurements of FIG. 12A. Note that there is a shear splitting signature for the frequency components between 4 and 6 kHz, but no shear splitting signature for the frequency components below 4 kHz. Given the presence of ($SH_{max}-SH_{min}$) in the far-field as indicated by the measured azimuthal variations in the compressional and shear slownesses or velocities, the measured dipole flexural dispersions suggest that $c_{144}=c_{155}$.
Figure 13B:
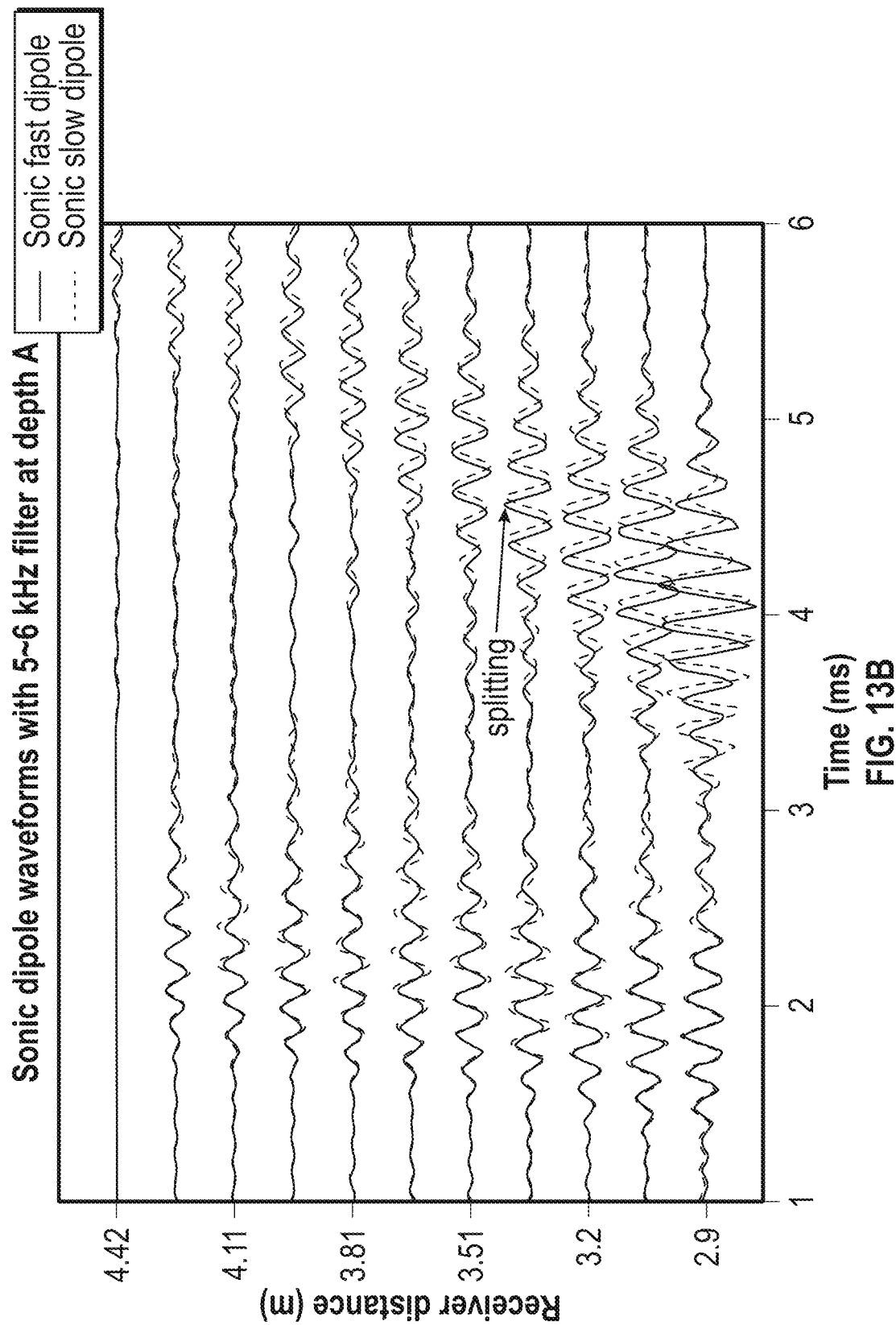
FIG. 13B shows an overlay of the fast- and slow dipole waveforms recorded by the sonic measurements carried out by the sonic tool at depth A of FIGS. 3A and 3B with a 5~6 kHz frequency filter.

FIG. 12A depicts an overlay of exemplary fast- and slow-dipole waveforms at a depth interval A recorded by sonic measurements. FIG. 12B shows the fast and slow dipole flexural dispersions at the depth interval A obtained by processing the cross-dipole waveform of FIG. 12A. FIG. 13A depicts an overlay of exemplary fast- and slow dipole waveforms at the depth interval A recorded by sonic measurements with a 1~2 kHz frequency filter. FIG. 13B depicts an overlay of exemplary fast- and slow dipole waveforms at the depth interval A recorded by sonic measurements with a 5~6 kHz frequency filter. Note that these plots show that there is no low-frequency shear splitting signature for the formation layers of the depth interval A at frequencies below 4 kHz, but there is a high frequency shear splitting signature for the formation layers of the depth interval A at frequencies between 4 and 6 kHz.

In block 913, the workflow determines if the evaluation of the azimuthal variation in compressional and/or shear slowness (or compressional and/or shear velocity) in block 909 indicates the presence of stress-induced shear anisotropy and if the evaluation of measured cross-dipole flexural dispersions in block 911 identifies a zone (e.g., one or more layers of the formation within the depth interval) with no low-frequency shear splitting signature and with a high-frequency shear splitting signature. If not, the operations of the workflow ends. If so, the operations continue to blocks 915-931.

In block 915, the workflow obtains an estimation of a number of material properties and geomechanical inputs for the selected depth interval, such as mud density (kg/m3), formation bulk density (kg/m3), pore pressure (MPa), overburden stress $S_v$ (MPa), minimum horizontal stress $SH_{min}$ (MPa), Biot's coefficient, ultrasonic depth of investigation (r/a), and mud slowness (us/ft). The overburden stress $S_v$ can be estimated by integrating an average density. Pore pressure and the minimum horizontal stress $SH_{min}$ can be estimated using depth gradients. These gradients can be based on a geomechanical analysis of the field.

In block 917, the workflow defines an initial guess for the maximum horizontal stress $SH_{max}$. In embodiment(s), this initial guess can be based on knowledge of the stress regime for the selected depth interval.

In block 919, the workflow uses the current value of the maximum horizontal stress $SH_{max}$ and the magnitude of the minimum horizontal stress $SH_{min}$ obtained in block 915 to define the difference of magnitude between maximum horizontal stress $SH_{max}$ and the minimum horizontal stress $SH_{min}$ as ($SH_{max}-SH_{min}$).

In block 921, the workflow uses the current value of the difference of magnitude between $SH_{max}$ and $SH_{min}$ (block 919) as well as the azimuthal variation in compressional and shear slowness (block 909) to estimate linear and non-linear elastic constants for the formation rock. The relationship between the value of the difference of magnitude between $SH_{max}$ and $SH_{min}$ and the azimuthal variation in compressional and shear slowness that produces an estimate for the linear and non-linear elastic constants for the formation rock can be provided by the equations described above.

Figure 14A:
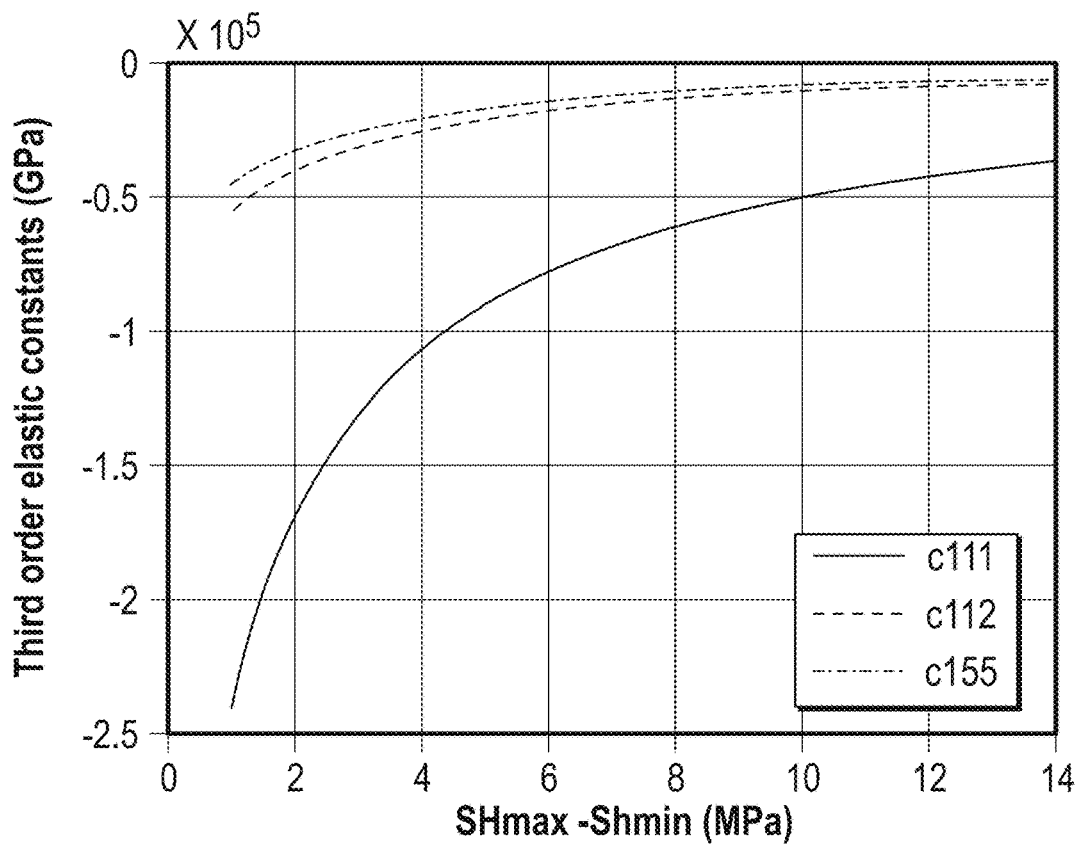
FIG. 14A are plots that represent the relationships between the horizontal stress difference ($SH_{max}-SH_{min}$) and certain nonlinear third-order elastic constants in the hydrostatic reference state computed by equations (35), (36), and (17) as described herein.
Figure 14B:
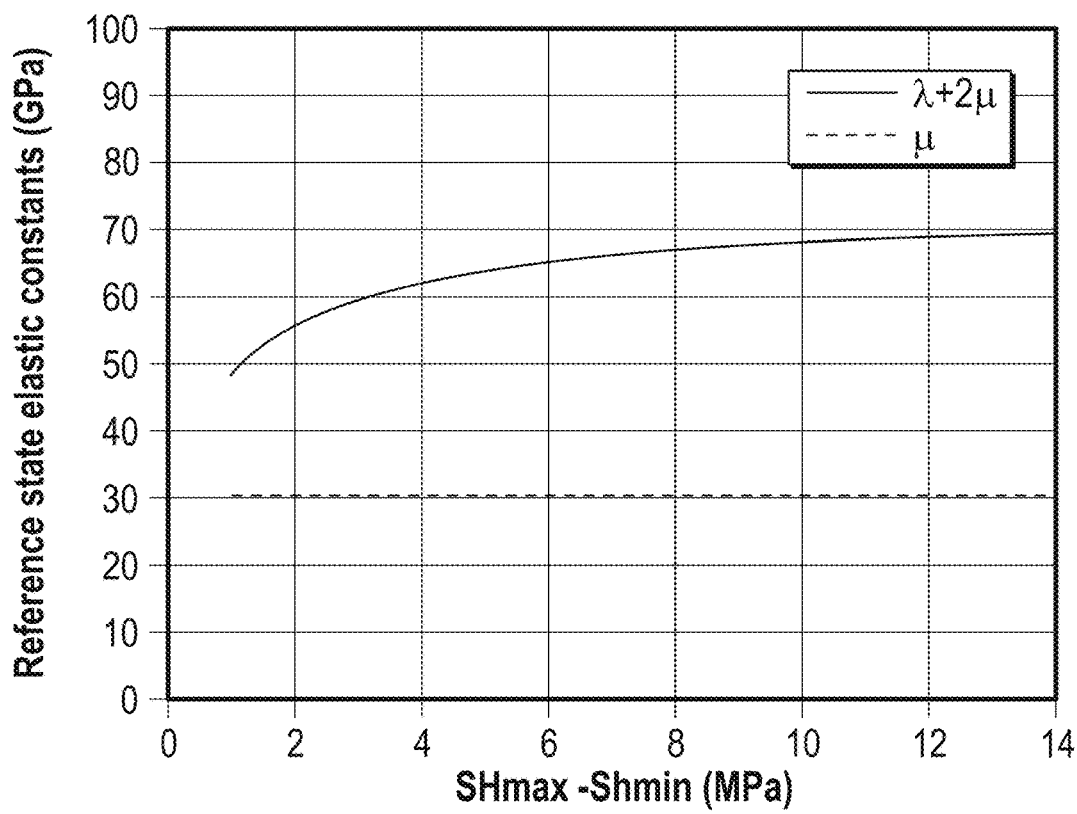
FIG. 14B are plots that represent the relationships between the horizontal stress difference ($SH_{max}-SH_{min}$) and certain linear elastic constants in the hydrostatic reference state computed by equations (37) and (38) as described herein.

In embodiment(s), the relationship between the value of the difference of magnitude between $SH_{max}$ and $SH_{min}$ and the non-linear elastic constants for the formation rock can be provided by Equations (35), (36), and (17) as described above. This relationship is shown by the plot of FIG. 14A. Likewise, the relationship between the value of the difference of magnitude between $SH_{max}$ and $SH_{min}$ and the linear elastic constants for the formation rock can be provided by Equations (37) and (38) as described above. This relationship is shown by the plot of FIG. 14B. Then, different values for the horizontal stress difference ($SH_{max}-SH_{min}$) can be selected and used together with the material properties and geomechanical inputs of the depth interval to calculate azimuthal variations in compressional and shear velocities using equations (1), (4), and (5) as described above. Note that these relationships can be calculated at a predefined radius (such as r=1.1a) and they are independent of the horizontal stress differences ($SH_{max}-SH_{min}$). Examples of the resultant azimuthal variations in compressional and shear velocities are provided by the plot of FIG. 15. Similarly, azimuthal variations in the effective compressional modulus c11 can be calculated from equations (1) and (2) as described above. An example of the resultant azimuthal variations in the effective compressional modulus c11 is provided by the plot of FIG. 16A for two different choices of ($SH_{max}-SH_{min}$). Similarly, azimuthal variations in the effective compressional modulus c22 can be calculated from equations (1) and (3) as described above. An example of the resultant azimuthal variations in the effective compressional modulus c22 is provided by the plot of FIG. 16B for two different choices of ($SH_{max}-SH_{min}$). Similarly, azimuthal variations in the effective compressional modulus $c_{33}$ can be calculated from equations (1) and (4) as described above. An example of the resultant azimuthal variations in the effective compressional modulus $c_{33}$ is provided by the plot of FIG. 16C for two different choices of ($SH_{max}-SH_{min}$).

Figure 16A:
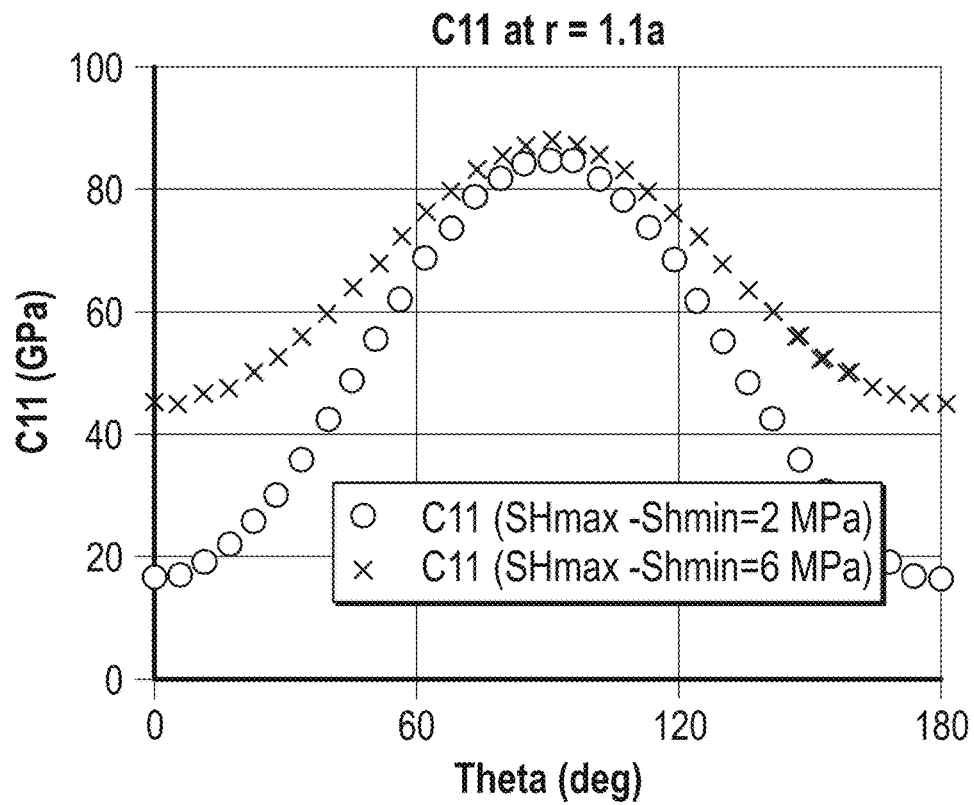
FIG. 16A are plots that depict azimuthal variations in the elastic modulus C11 for two different choices of ($SH_{max}-SH_{min}$) at r=1.1a computed from equations (1) and (2) as described herein.
Figure 16B:
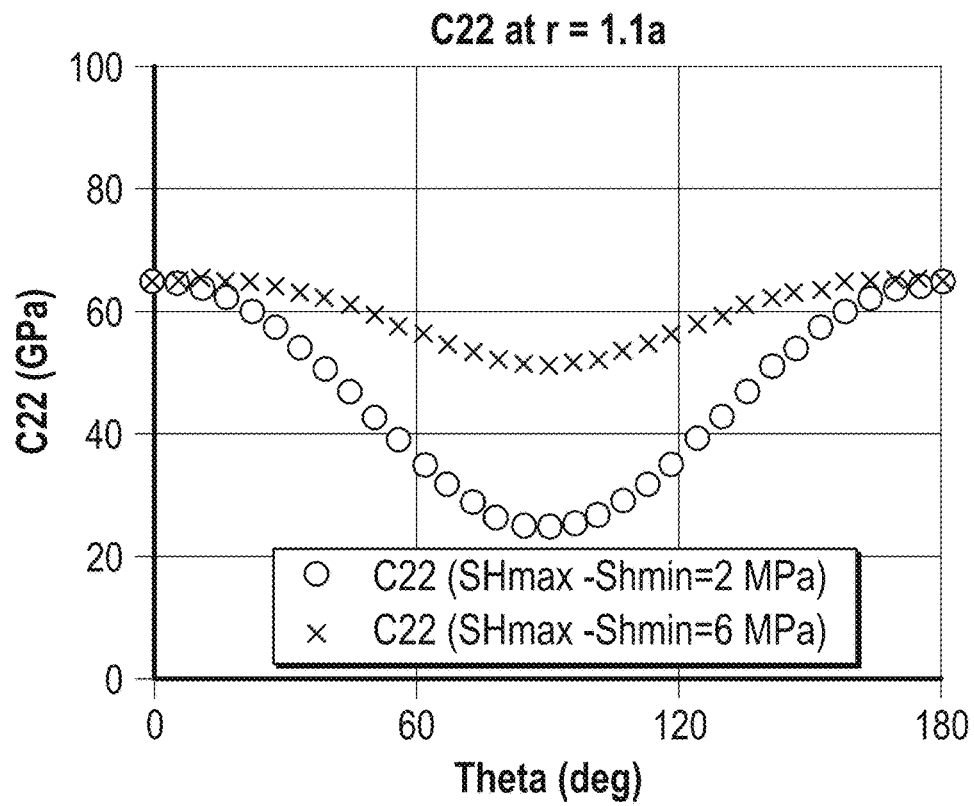
FIG. 16B are plots that depict azimuthal variations in the elastic modulus C22 for two different choices of ($SH_{max}-SH_{min}$) at r=1.1a, computed from equations (1) and (3) as described herein.
Figure 16C:
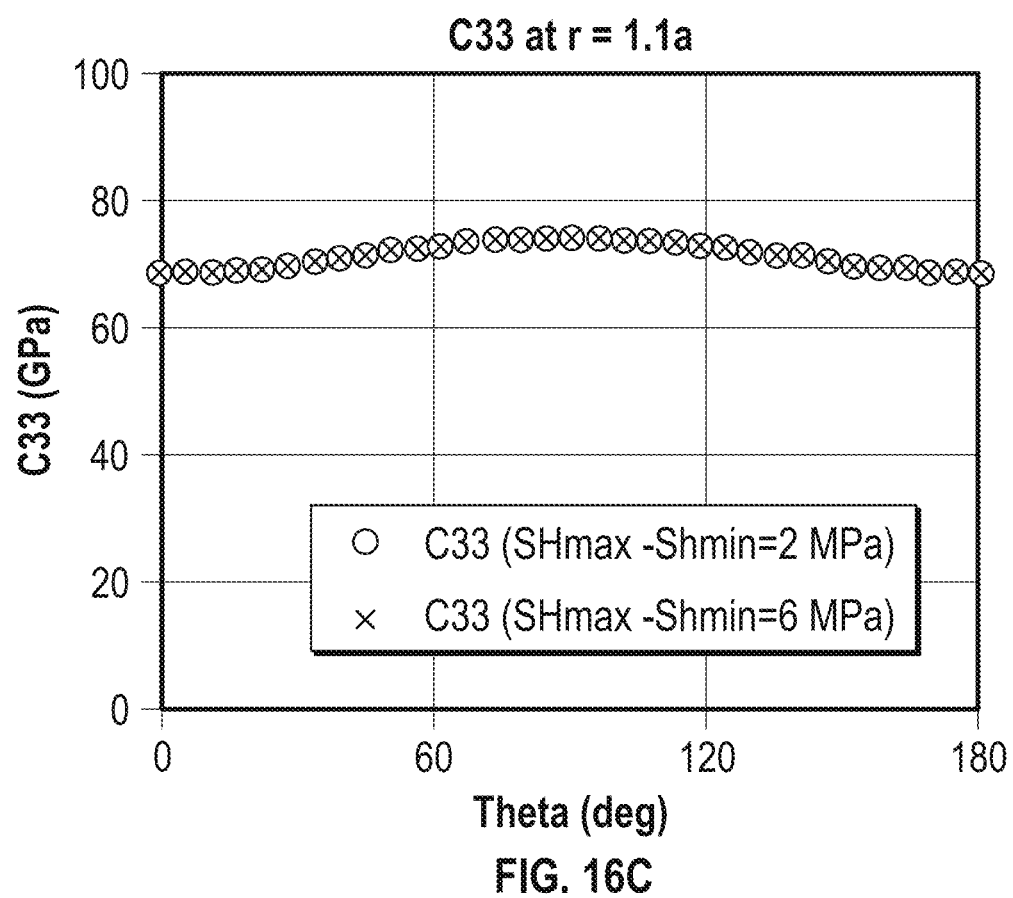
FIG. 16C are plots that depict azimuthal variations in the elastic modulus C33 for two different choices of ($SH_{max}-SH_{min}$) at r=1.1a, computed from equations (1) and (4) as described herein.

Note that the azimuthal variations for the effective compressional modulus c11 and c22 shown in FIGS. 16A and 16B are different for the two difference choices of ($SH_{max}-SH_{min}$), while the azimuthal variations for the effective compressional modulus c33 shown in FIG. 16C are effectively the same for the two difference choices of ($SH_{max}-SH_{min}$). Consequently, the flexural dispersions derived from the sonic measurements can be different for the two different choices of ($SH_{max}-SH_{min}$). This provides evidence that the sonic measurements can be used in the modeling and inversion operations of blocks 917 to 931.

In block 923, the current value of $SH_{max}$, the magnitudes of $SH_{min}$ and $S_v$ (block 915) and the linear and non-linear elastic constants for the formation rock as derived from block 921 are used as inputs to numerical modeling that generates synthetic sonic data (e.g., synthetic cross-dipole flexural dispersions). In exemplary embodiments, the numerical modeling can employ three-dimensional finite element or finite difference numerical methods that simulate borehole wave propagation in an anisotropic medium. For example, Liu, Q. H., and B. K. Sinha, "A 3D cylindrical PML/FDTD method for elastic waves in fluid-filled pressurized boreholes in triaxially stressed formations," Geophysics, Vol. 68, 2003, pgs. 1731-1743, describes suitable numerical simulation methods that simulate borehole wave propagation in an anisotropic medium.

In block 925, the properties of the synthetic sonic data (e.g., synthetic cross-dipole flexural dispersions) are compared to corresponding properties of the measured sonic data (e.g., measured cross-dipole flexural dispersions of block 905).

In block 927, the workflow checks whether the comparison of block 925 determines that the properties of the synthetic sonic data (e.g., synthetic cross-dipole flexural dispersions) match the corresponding properties of the measured sonic data (e.g., measured cross-dipole flexural dispersions of block 905). If not, the workflow adjusts and updates the value of $SH_{max}$ in block 929 and the operations return to perform another iteration of the inversion of blocks 919 to 927. If so, the workflow has determined that the inversion has converged to a solution and the operations continue to block 931.

In block 931, the magnitude of solved-for maximum horizontal stress $SH_{max}$ as well as the solved-for linear and non-linear elastic constants for the formation rock can be stored and/or output for further processing. Such data can be used in reservoir analysis to identify layers that are subject to large anisotropic horizontal stresses in the absence of breakouts. Furthermore, the overburden stress, maximum and minimum horizontal stresses, pore pressure, wellbore pressure and rock strength can be used to produce a failure model to aid in well planning, wellbore stability calculations and reservoir management.

An Illustrative Example

Processing of data obtained from both ultrasonic measurements and sonic data measurements at a depth interval within a fluid-filled borehole yields rock material parameters as summarized in Table 1. In addition, an estimation of a number of material properties and geomechanical inputs for the selected depth interval are provided as summarized in Table 1. The overburden stress can be estimated by integrating an average density. Pore pressure and the minimum horizontal stress can be estimated using depth gradients. These gradients can be based on a geomechanical analysis of the field. In summary, the inputs to the modeling and inversion operations of blocks 921 to 927 are listed in Table 1.

TABLE 1

Material parameters and geomechanical inputs at depth A

| | |
|---|---|
| Mud density (kg/m$^3$) | 1560 |
| Bulk density (kg/m$^3$) | 2673 kg/m$^3$ |
| Pore pressure (MPa) | 33.06 |
| Overburden stress (MPa) | 64.56 |
| Total minimum horizontal stress (MPa) | 52.72 |
| Biot's coefficient | 0.9 |
| Ultrasonic radial depth of investigation (r/a) | 1.1 |
| $V_p$ (r = 1.1a, θ = 0) (m/s) | 5049.7 |
| $V_p$ (r = 1.1a, θ = 90) (m/s) | 5244.3 |
| $V_s$ (r = 1.1a, θ = 0) (m/s) | 3255.7 |
| $V_s$ (r = 1.1a, θ = 90) (m/s) | 3493.0 |
| Mud slowness (us/ft) | 190 |

In block 921, equation (36) can be rewritten as:

$$\frac{c_{155}}{c_{112}} = \frac{v_{s0}^2 - v_{s90}^2}{c_{c0}^2 - v_{c90}^2} = 0.8.$$

Using equations (35), (36), and (17), relationships between the nonlinear third-order elastic constants and difference in the horizontal stress magnitudes ($SH_{max}$-$SH_{min}$) can be derived as shown in the plot of FIG. 14A. Likewise, equations (37) and (38) can be used to derive the relationships between linear elastic constants and difference in the horizontal stress magnitudes ($SH_{max}$-$SH_{min}$) as shown in the plot of FIG. 14B.

Figure 15:
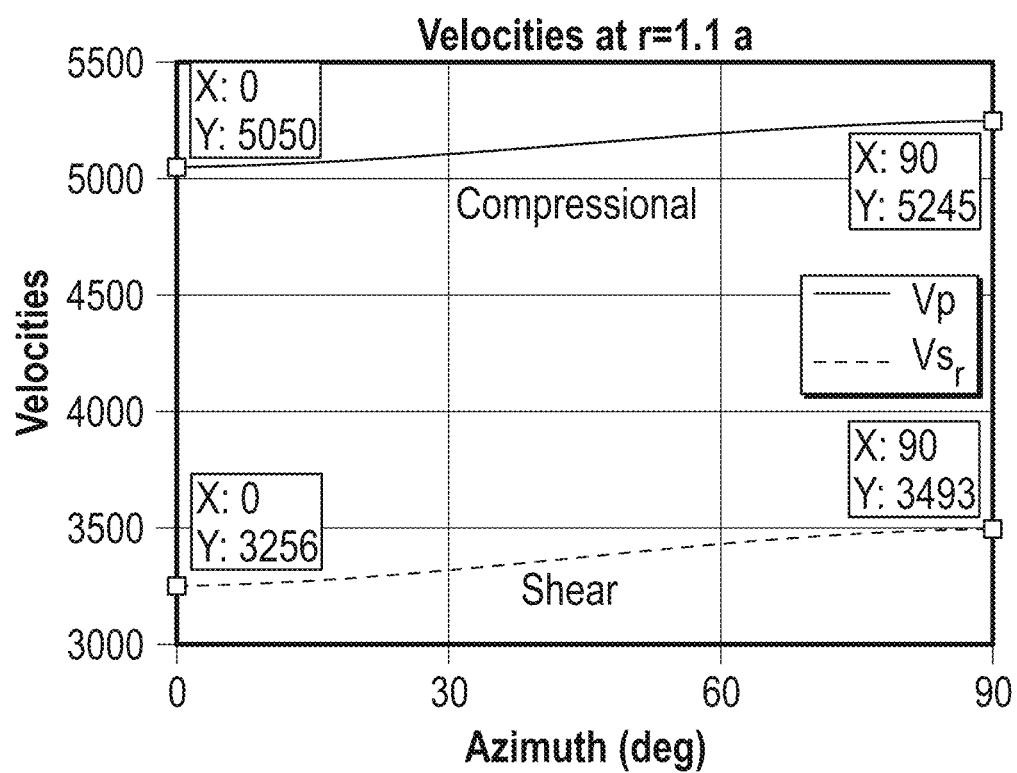
FIG. 15 is a plot that depicts azimuthal variations in the compressional ($V_p$) and shear ($V_s$) velocities at r/a=1.1 computed from equations (1), (4), and (5), where $Vp=\sqrt{c_{33}/\rho}$ and $Vs=\sqrt{c_{44}/\rho}$.

At this point, different values of the horizontal stress difference ($SH_{max}$-$SH_{min}$) are selected and used together with all parameters listed in Table 1 to calculate azimuthal variations in compressional and shear velocities using equations (1), (4), and (5) as shown in FIG. 15. Note that these relationships are calculated at r=1.1a, and they are independent of the horizontal stress difference ($SH_{max}$-$SH_{min}$).

Similarly, azimuthal variation in the effective compressional modulus C11 is calculated from equations (1) and (2) as shown in FIG. 16A for two different choices of ($SH_{max}$-$SH_{min}$). Similarly, azimuthal variation in the effective compressional modulus C22 is calculated from equations (1) and (3) as shown in FIG. 16B for two different choices of ($SH_{max}$-$SH_{min}$). Similarly, azimuthal variation in the effective compressional modulus C33 is calculated from equations (1) and (4) as shown in FIG. 16C for two different choices of ($SH_{max}$-$SH_{min}$). Note that the results of FIG. 16C confirms that they overlay for different choices of ($SH_{max}$-$SH_{min}$) as is the case for compressional velocity shown in FIG. 15.

Then, in block 923, cross-dipole waveforms can be generated using 3D-cylindrical finite-difference code with the following two sets of model parameters as provided in block 921:

Case 1: ($SH_{max}$-$SH_{min}$)=2 MPa, $C_{111}$=−170000 GPa, C=−40520 GPa, $C_{155}$=−32390 GPa, $M_{ref}$=55.49 GPa, $\mu_{ref}$=30.48 GPa, Case 2: ($SH_{max}$-$SH_{min}$)=6 MPa, $C_{111}$=−78420 GPa, $C_{112}$=−18680 GPa, $\mu_{155}$=−14930 GPa, $M_{ref}$=65.07 GPa, $\mu_{ref}$=30.48 GPa.

FIGS. 17A1 and 17A2 depicts synthetic dipole waveforms and processed flexural dispersion plots generated by finite-difference modeling using the parameters of Case 1 where $SH_{min}$=52.72 MPa and $SH_{max}$=54.72 MPa.

FIGS. 17B1 and 17B2 displays synthetic dipole waveforms and processed flexural dispersion plots generated by finite-difference modeling using the parameters of Case 2 where $SH_{min}$=52.72 MPa and $SH_{max}$=58.72 MPa.

Figure 18:
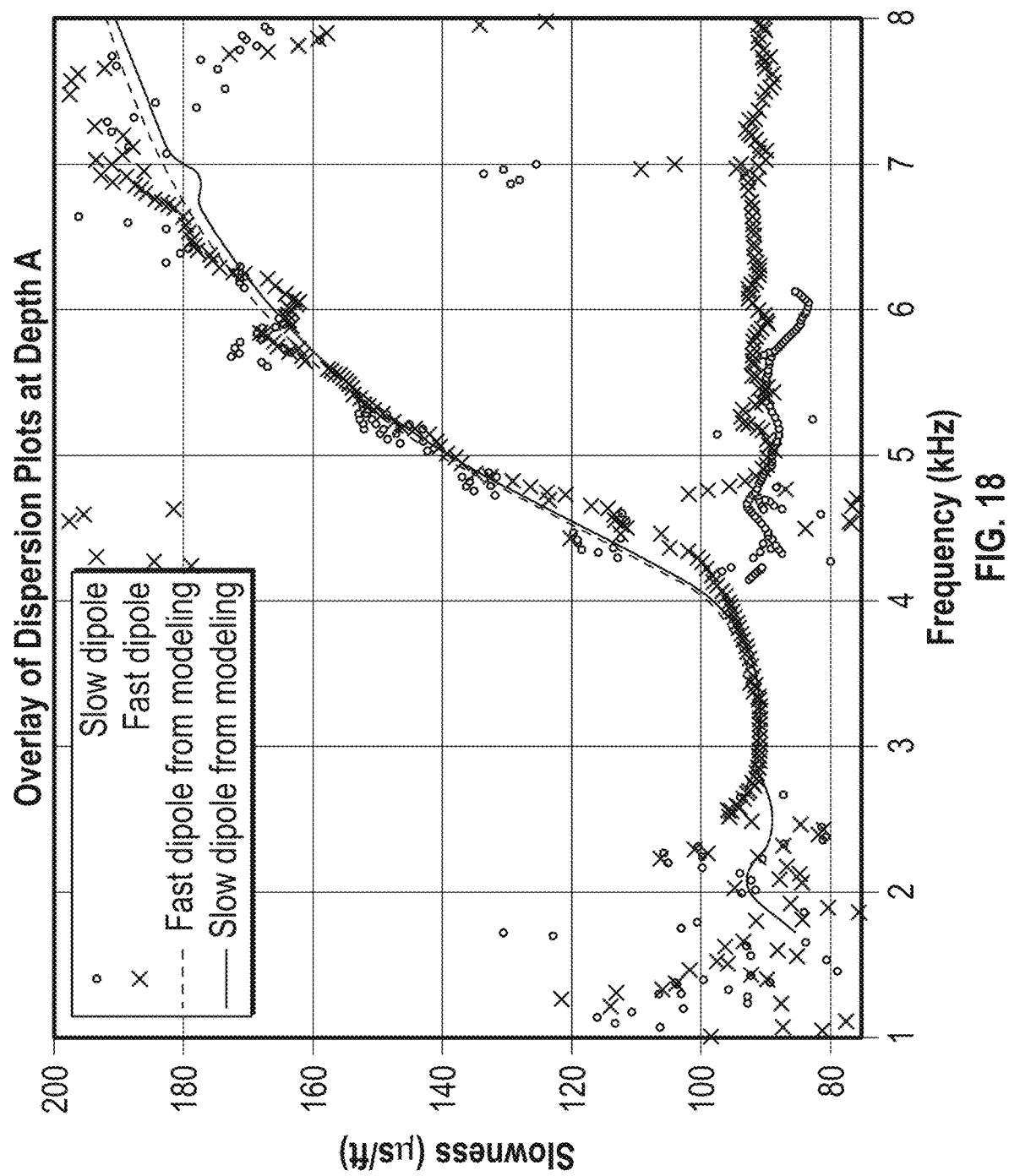
FIG. 18 are plots that depict the fast- and slow-dipole flexural dispersions (field data) obtained by processing the measured dipole sonic waveforms shown in FIG. 12A. Note that even though there is no shear splitting signature at low frequencies, high-frequency fast- and slow-dipole flexural dispersions exhibit differences that are predicted by an acoustoelastic model. This signature is associated with a layer that is subjected to anisotropic horizontal stresses, but the two nonlinear elastic constants $c_{155}$=$c_{144}$. The field data is displayed together with dipole flexural dispersion data determined from the synthetic sonic data generated with FDTD modeling using the following parameters: $c_{111}$=−170000 GPa, $c_{112}$=−40520 GPa, $c_{155}$=−32390 GPa, $M_{ref}$=55.49 GPa, $\mu_{ref}$=30.48 GPa, $SH_{min}$=52.72 MPa, $SH_{max}$=54.72 MPa.

FIG. 18 shows the measured fast- and slow-dipole flexural dispersions of FIG. 12B together with simulated fast- and slow-dipole flexural dispersions generated by the finite-difference modeling with the following set of parameters: $c_{111}$=−170000 GPa, $C_{112}$=−40520 GPa, $c_{155}$=−32390 GPa, $M_{ref}$=55.49 GPa, $\mu_{ref}$=30.48 GPa, $SH_{min}$=52.72 MPa, $SH_{max}$=54.72 MPa. Note that measured fast- and slow-dipole flexural dispersions have no shear slowness splitting at low frequencies but do have shear slowness splitting at higher frequencies as predicted by an acoustoelastic model. This signature is associated with a layer that is subjected to anisotropic horizontal stresses, where the two nonlinear elastic constants $c_{155}$ and $c_{144}$ are equal. The simulated fast- and slow-dipole flexural dispersions show good agreement with the measured cross-dipole dispersions obtained from the sonic measurements.

In the example, the modeling and inversion operations of blocks 921 to 927 solves for the linear and nonlinear constants (which are referred to a chosen reference state) as follows: $M_{ref}$=55.49 GPa; $\mu_{ref}$=30.48 GPa; $c_{111}$=−170000 GPa; $c_{112}$=−40520 GPa; $c_{155}$=−32390 GPa; and the maximum horizontal stress $SH_{max}$=54.72 MPa. The overburden stress $S_v$=64.56 MPa; and the minimum horizontal stress $SH_{min}$=52.72 MPa are estimated from conventional techniques.

FIGS. 19A and 19B displays reconstructed azimuthal variations in the compressional (DTc) and shear (DTs) slownesses as a function of radial distance normalized to the borehole radius using the inverted results and comparison with field data. Note that the azimuthal variation at radial position r=1.1a is rather close to the measured azimuthal variation from the ultrasonic measurements. This confirms our initial estimate of the effective radial depth of investigation of such ultrasonic measurements.

Optionally or additionally, the modeling and inversion operations of blocks 921 to 927 can generate synthetic ultrasonic data in addition to the synthetic sonic data and evaluate convergence by matching both the synthetic ultrasonic data to the measured ultrasonic data and the synthetic sonic data to the measured sonic data. In this case, the determination of the matching can involve comparing one or more properties (e.g., azimuthal variations of compressional and shear slownesses or velocities) of the synthetic ultrasonic data to corresponding properties of the measured ultrasonic data as derived from the ultrasonic waveform data, and comparing one or more properties (e.g., cross-dipole flexural dispersions) of the synthetic sonic data to corresponding properties of the measured sonic data as derived from the sonic waveform data. For example, the iterative inversion process may continue until the difference between the corresponding properties of the synthetic and measured ultrasonic data and the difference between the corresponding properties of the synthetic and measured sonic data collectively satisfy a predefined criterion. In this manner, the iterative inversion process looks for a match in both the measured sonic data and measured ultrasonic data.

The methodology as described herein is applicable to logging data in a vertical well. If the well is deviated or horizontal, other parameters can be considered.

The methodology as described herein can also involve confirming that the rock is not damaged in the near-wellbore region. This can be accomplished by inspecting the ultrasonic measurements acquired by the ultrasonic tool. For example, the ultrasonic measurements can involve a pulse-echo measurement using a trans-receiver (or a transducer capable of radiating acoustic energy and receiving echoes from the borehole wall). The image of the reflection echo amplitude or/and transit time can be inspected to determine if it shows that the rock face remains intact without the presence of discernible breakouts. This inspection can be used to determine that the near-wellbore is not damaged. Then, if there is azimuthal variation of the slowness (either P or/and S) as determined from the processing of the other ultrasonic measurements (which can use at least one transmitter and a plurality of receivers), the workflow can thus identify horizontal stress anisotropy in a non-damaged near-wellbore and can proceed to estimate the magnitude of the maximum horizontal stress as described above.

The methodology described herein for processing the ultrasonic measurement data and sonic measurement data in order to estimate the magnitude of maximum horizontal stress in a formation can be performed by a processing system. The processing system is not limited to any particular device type or system. The processing system may be a computer, such as a laptop computer, a desktop computer, or a mainframe computer. The processing system may include a graphical user interface (GUI) so that a user can interact with the processing system. The processing system may also include one or more processors (e.g., microprocessor, microcontrollers, digital signal processors, or general purpose computers) for executing any of the methods and processes described above.

Figure 20:
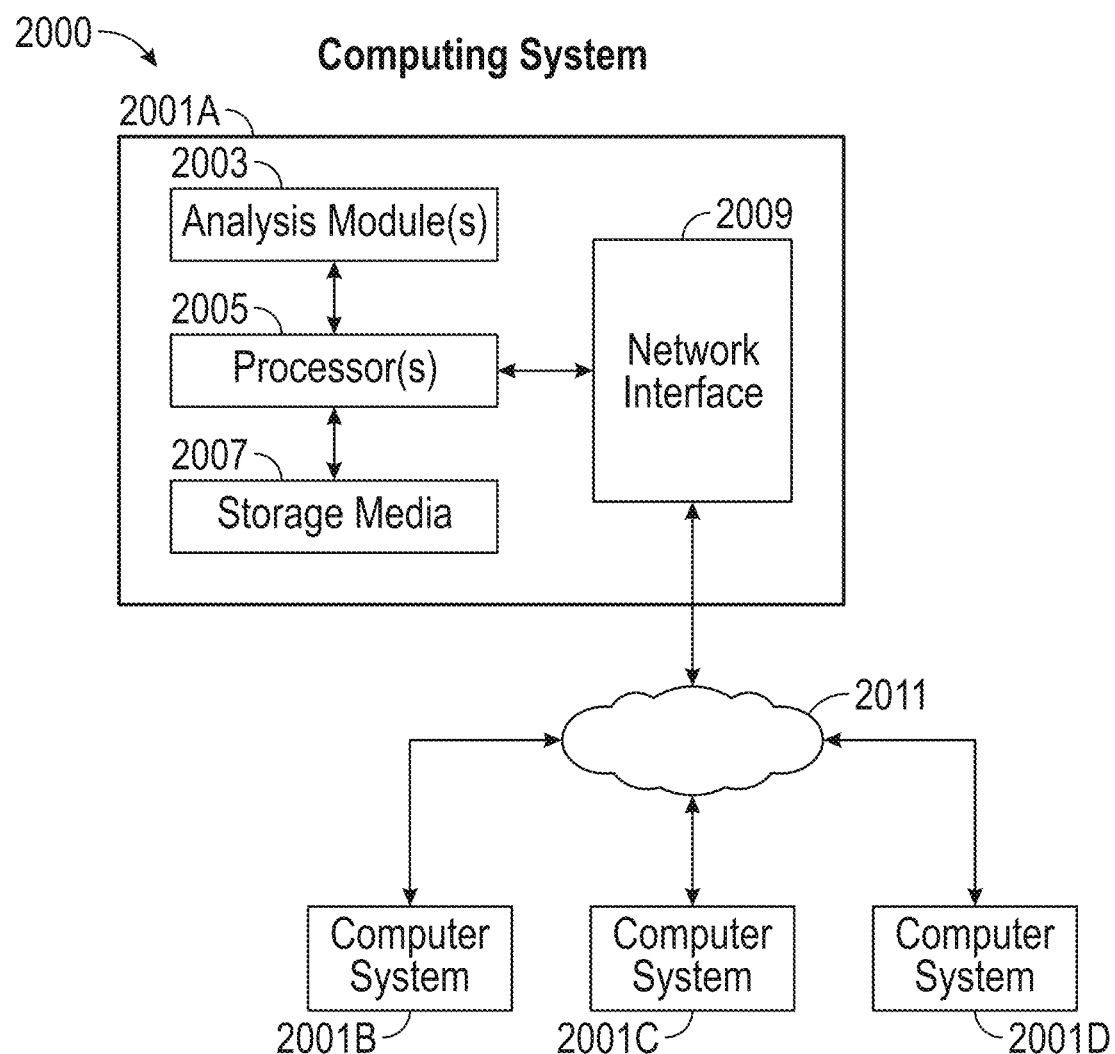
FIG. 20 is a schematic diagram of an example computing system that can be used to implement the processor subsystem of FIG. 1.

FIG. 20 shows an example computing system 2000 that can be used to implement the processor subsystem 170 of FIG. 1 or parts thereof. The computing system 2000 can be an individual computer system 2001A or an arrangement of distributed computer systems. The computer system 2001A includes one or more analysis modules 2003 (a program of computer-executable instructions and associated data) that can be configured to perform various operations according to some embodiments, such as the operations described above. To perform these various operations, the analysis module(s) 2003 executes on one or more processors 2005, which is (or are) connected to one or more storage media 2007. The processor(s) 2005 can also be connected to a network interface 2009 to allow the computer system 2001A to communicate over a data network 2011 with one or more additional computer systems and/or computing systems, such as 2001B, 2001C, and/or 2001D. Note that computer systems 2001B, 2001C and/or 2001D may or may not share the same architecture as computer system 2001A, and may be located in different physical locations.

The processor 2005 can include at least a microprocessor, microcontroller, processor module or subsystem, programmable integrated circuit, programmable gate array, digital signal processor (DSP), or another control or computing device.

The storage media 2007 can be implemented as one or more non-transitory computer-readable or machine-readable storage media. Note that while in the embodiment of FIG. 20, the storage media 2007 is depicted as within computer system 2001A, in some embodiments, storage media 2007 may be distributed within and/or across multiple internal and/or external enclosures of computing system 2001A and/or additional computing systems. Storage media 2007 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 2003 can be provided on one computer-readable or machine-readable storage medium of the storage media 2007, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 2000 is only one example of a computing system, and that computing system 2000 may have more or fewer components than shown, may combine additional components not depicted in the embodiment of FIG. 20, and/or computing system 2000 may have a different configuration or arrangement of the components depicted in FIG. 20. The various components shown in FIG. 20 may be implemented in hardware, software, or a combination of both hardware and software, including one or more signal processing and/or application specific integrated circuits.

In embodiment(s), the operations of the processor subsystem 170 or computing system 2000 as described herein may be implemented by running one or more functional modules in an information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

In one embodiment, the operations of the processor subsystem 170 or computing system 2000 as described herein may be implemented by running one or more functional modules in an information processing apparatus (such as a workstation) located at or near the wellsite and/or in an information processing apparatus that is part of the BHA of the downhole tool In another embodiment, the operations of the processor subsystem 170 or computing system 2000 as described herein may be implemented by running one or more functional modules in a cloud-based information processing apparatus.

The methods and processes described above such as, for example, modeling, plotting, analyzing, and/or control of any recited hardware, may be performed by a processing system. The processing system may include a single processor, multiple processors, or a computer system. Where the processing system includes multiple processors, the multiple processors may be disposed on a single device or on different devices at the same or remote locations relative to each other. The processor or processors may include one or more computer processors (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Thus, the methods and processes described above may be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, Matlab, JAVA or other language or environment). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Any of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language or a high-level language such as C, C++ or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

To the extent used in this description and in the claims, a recitation in the general form of "at least one of [a] and [b]" should be construed as disjunctive. For example, a recitation of "at least one of [a], [b], and [c]" would include [a] alone, [b] alone, [c] alone, or any combination of [a], [b], and [c].

Although a few example embodiments have been described in detail above, those skilled in the art will readily appreciate that many modifications are possible in the example embodiments without materially departing from embodiments disclosed herein. Accordingly, all such modifications are intended to be included within the scope of this disclosure.

What is claimed is:

1. A method for characterizing a formation, comprising;
    placing at least one acoustic logging tool within a borehole traversing the formation, wherein the at least one acoustic logging tool includes at least one ultrasonic transmitter and a plurality of ultrasonic receivers as well as at least one sonic transmitter and a plurality of sonic receivers;
    configuring the at least one ultrasonic transmitter to excite ultrasonic waveforms that travel into the formation, and configuring the plurality of ultrasonic receivers to record the ultrasonic waveforms to obtain measured ultrasonic data;
    configuring the at least one sonic transmitter to excite sonic waveforms that travel into the formation, and configuring the plurality of sonic receivers to record the sonic waveforms to obtain measured sonic data; and
    determining maximum horizontal stress in the formation using the measured ultrasonic data and the measured sonic data, wherein determining the maximum horizontal stress in the formation involves:
    (i) setting a value for maximum horizontal stress in the formation;
    ii) deriving a value representing difference between maximum horizontal stress and minimum horizontal stress in the formation based the value for the maximum horizontal stress set in i);
    iii) using a model that describes acoustoelastic effects in rocks to relate the value representing difference between maximum horizontal stress and minimum horizontal stress in the formation as derived in ii) to a plurality of elastic constant values;
    iv) using the value representing difference between maximum horizontal stress and minimum horizontal stress in the formation as derived in ii) as well as the plurality of elastic constant values of iii) as inputs to numerical simulation that simulates acoustic propagation in the borehole to derive simulated sonic data; and
    v) comparing at least one property of the synthetic sonic data to a corresponding property of the measured sonic data to determine whether there is a match between the synthetic sonic data and the measured sonic data; and
    vi) if there is no match in v), updating the value for maximum horizontal stress in the formation and repeating ii), iii), iv) and v) using the updated value for maximum horizontal stress in the formation; and
    vii) if there is a match in v), determining magnitude of maximum horizontal stress in the formation as the value of maximum horizontal stress in the formation used to produce the synthetic sonic data that matches the measured sonic data.

2. The method of claim 1, wherein the at least one acoustic tool includes an ultrasonic tool and a sonic tool, the ultrasonic tool comprising the at least one ultrasonic transmitter and the plurality of ultrasonic receivers, and the sonic tool comprising the least one sonic transmitter and the plurality of sonic receivers.

3. The method of claim 1, wherein the ultrasonic waveforms travel through the near-wellbore region of the formation.

4. The method of claim 1, further comprising:
viii) if there is a match in v), determining a plurality of elastic constants for the formation as the value for the plurality of elastic constant values used to produce the synthetic sonic data that matches the measured sonic data.

5. The method of claim 1, wherein the plurality of elastic constant values of the model in iii) include elastic constants $c_{144}$ and $c_{155}$ that are equal to one another.

6. The method of claim 1, wherein the formation is a laminated formation.

7. The method of claim 1, wherein determining the maximum horizontal stress in the formation is performed only after locating a zone that has a number of predefined properties.

8. The method of claim 7, wherein the number of predefined properties are selected from the group consisting of: azimuthal variation in velocity as determined from processing the measured ultrasonic data, a high frequency shear splitting signature as determined from processing the measured sonic data, and no low frequency shear splitting signature as determined from processing the measured sonic data.

9. The method of claim 1, wherein the comparison of v) involves comparing a synthetic slowness dispersion generated from the synthetic sonic data to a measured slowness dispersion generated from the measured sonic data.

10. The method of claim 9, wherein the synthetic slowness dispersion and the measured slowness dispersion are dipole flexural slowness dispersions.

11. The method of claim 1, wherein the numerical simulation of iv) uses an overburden stress of the formation as an input.

12. The method of claim 11, wherein the overburden stress of the formation determined from integrating a density log of the formation.

13. The method of claim 1, wherein the numerical simulation of iv) uses a magnitude of minimum horizontal stress of the formation as an input.

14. The method of claim 13, wherein the magnitude of minimum horizontal stress of the formation is determined from at least one of (i) a mini-fracture test and (ii) a leak-off test.

15. A method for characterizing a formation, comprising;
placing at least one acoustic logging tool within a borehole traversing the formation, wherein the at least one acoustic logging tool includes at least one ultrasonic transmitter and a plurality of ultrasonic receivers as well as at least one sonic transmitter and a plurality of sonic receivers;
configuring the at least one ultrasonic transmitter to excite ultrasonic waveforms that travel into the formation, and configuring the plurality of ultrasonic receivers to record the ultrasonic waveforms to obtain measured ultrasonic data;
configuring the at least one sonic transmitter to excite sonic waveforms that travel into the formation, and configuring the plurality of sonic receivers to record the sonic waveforms to obtain measured sonic data; and
determining maximum horizontal stress in the formation using the measured ultrasonic data and the measured sonic data; wherein determining the maximum horizontal stress in the formation involves:
(i) setting a value for maximum horizontal stress in the formation;
ii) deriving a value representing difference between maximum horizontal stress and minimum horizontal stress in the formation based the value for the maximum horizontal stress set in i);
iii) using a model that describes acoustoelastic effects in rocks to relate the value representing difference between maximum horizontal stress and minimum horizontal stress in the formation as derived in ii) to a plurality of elastic constant values;
iv) using the value representing difference between maximum horizontal stress and minimum horizontal stress in the formation as derived in ii) as well as the plurality of elastic constant values of iii) as inputs to numerical simulation that simulates acoustic propagation in the borehole to derive simulated sonic data as well as simulated ultrasonic data; and
v) comparing at least one property of the synthetic sonic data and at least one property of the synthetic ultrasonic data to corresponding properties of the measured sonic data and the measured ultrasonic data to determine whether there is a match between such data; and
vi) if there is no match in v), updating the value for maximum horizontal stress in the formation and repeating ii), iii), iv) and v) using the updated value for maximum horizontal stress in the formation; and
vii) if there is a match in v), determining magnitude of maximum horizontal stress in the formation as the value of maximum horizontal stress in the formation used to produce the matching data.

16. The method of claim 15, wherein the comparison of v) involves comparing a synthetic slowness dispersion generated from the synthetic sonic data to a measured slowness dispersion generated from the measured sonic data and comparing azimuthal variation in synthetic slowness or velocity generated from the synthetic ultrasonic data to azimuthal variation in measured slowness or velocity generated from the measured ultrasonic data.

17. The method of claim 15, wherein the formation is a laminated formation.

* * * * *